(12) United States Patent
Marsh

(10) Patent No.: US 6,471,388 B1
(45) Date of Patent: Oct. 29, 2002

(54) ILLUMINATION APPARATUS FOR EDGE LIT SIGNS AND DISPLAY

(75) Inventor: Brent Marsh, San Francisco, CA (US)

(73) Assignee: BJI Energy Solutions LLC, New York, NY (US)

( * ) Notice: Subject to any disclaimer, the term of this patent is extended or adjusted under 35 U.S.C. 154(b) by 0 days.

(21) Appl. No.: 09/476,236

(22) Filed: Dec. 30, 1999

(51) Int. Cl.[7] .................. B64D 47/06; F21V 5/00; G09F 13/18
(52) U.S. Cl. .................. 362/559; 362/217; 362/225; 362/260; 362/396; 362/812; 362/31; 313/318.11; 40/570
(58) Field of Search ................ 362/559, 217, 362/225, 260, 396, 812, 31, 27; 313/318.11; 40/570

(56) References Cited

U.S. PATENT DOCUMENTS

| | | | |
|---|---|---|---|
| 3,984,931 A | | 10/1976 | Belokin, Jr. |
| 4,229,780 A | | 10/1980 | Nelson |
| 4,385,343 A | | 5/1983 | Plumly |
| 4,435,743 A | * | 3/1984 | Plumly ............. 362/31 |
| 4,587,597 A | | 5/1986 | Meyers |
| 4,587,600 A | | 5/1986 | Morten |
| 4,713,019 A | | 12/1987 | Gaynor |
| 5,122,074 A | | 6/1992 | Maag et al. |
| 5,276,591 A | | 1/1994 | Hegarty |
| 5,370,546 A | | 12/1994 | Evanisko |
| 5,390,094 A | | 2/1995 | Evanisko |
| 5,410,454 A | | 4/1995 | Murase et al. |
| 5,433,024 A | | 7/1995 | Lerner |
| 5,445,540 A | | 8/1995 | Barrand |
| 5,485,291 A | | 1/1996 | Qiao et al. |
| 5,603,627 A | | 2/1997 | Evanisko |
| 5,640,792 A | | 6/1997 | Smith et al. |
| 5,727,869 A | | 3/1998 | Crosby et al. |
| 5,877,585 A | | 3/1999 | Fulop et al. |
| 5,918,396 A | * | 7/1999 | Jung ............. 40/546 |
| 5,964,515 A | * | 10/1999 | Ikeuchi ............. 362/26 |

OTHER PUBLICATIONS

Hewlett Packard, "Light Guide Techniques Using LED Lamps," "Application Brief I–003," Hewlett–Packard Co., pp. 1–20, (1997).

* cited by examiner

Primary Examiner—Sandra O'Shea
Assistant Examiner—Ali Alavi
(74) Attorney, Agent, or Firm—Marvin H. Kleinberg; Marshall A. Lerner; Kleinberg & Lerner LLP

(57) ABSTRACT

An optical module for edge lit display signs utilizes energy efficient miniature cold cathode fluorescent lamps. Lampholders that mechanically and electrically couple the lamps include resilient sockets and clamps shaped to engage the outer surface of the resilient sockets. A preferred optical module intended as an illumination source for edge-lit emergency exit signs has two spaced apart cold cathode fluorescent lamps and an optical reflector configured to increase the light coupled to display surfaces of the edge-lit sign.

27 Claims, 15 Drawing Sheets

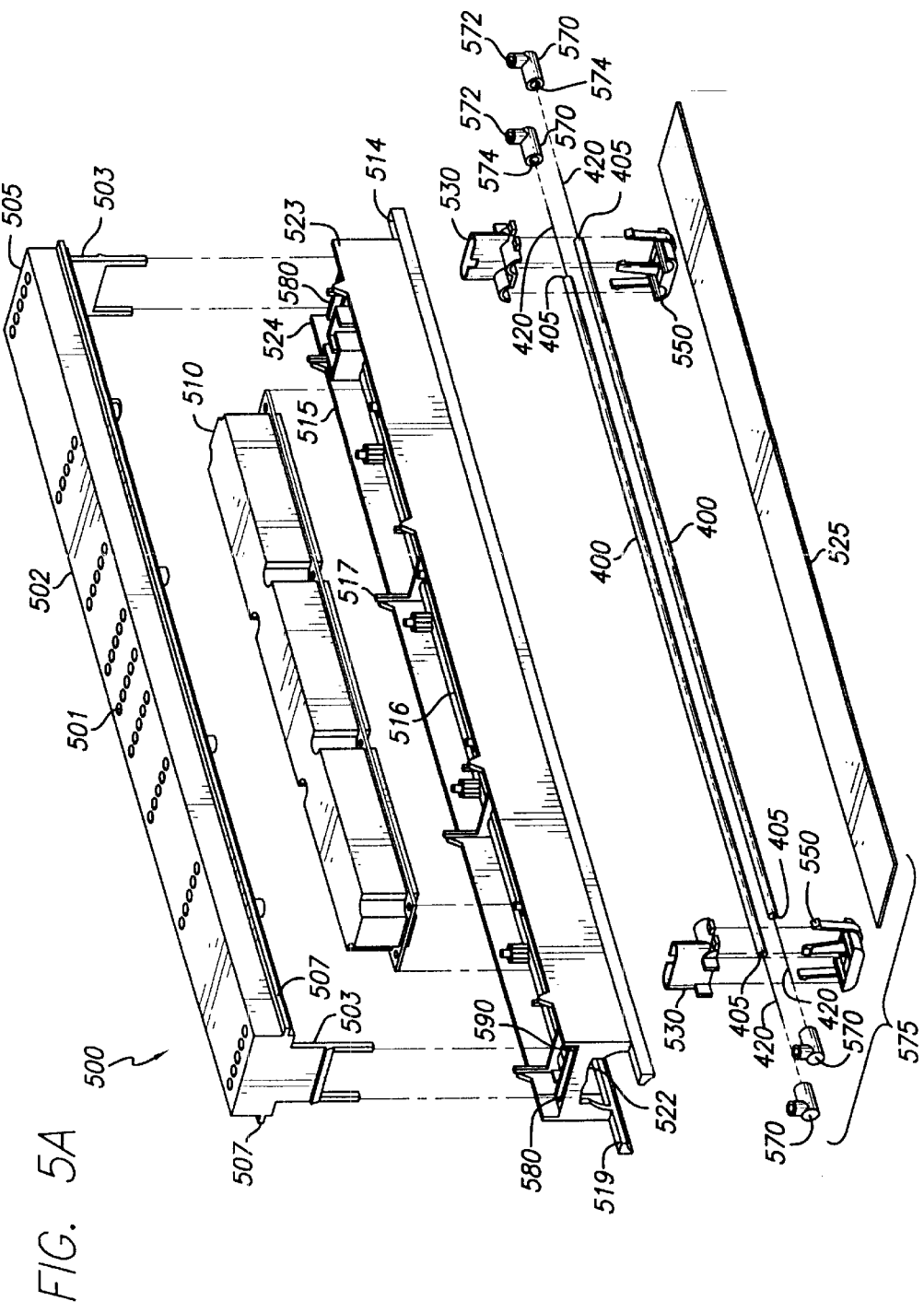

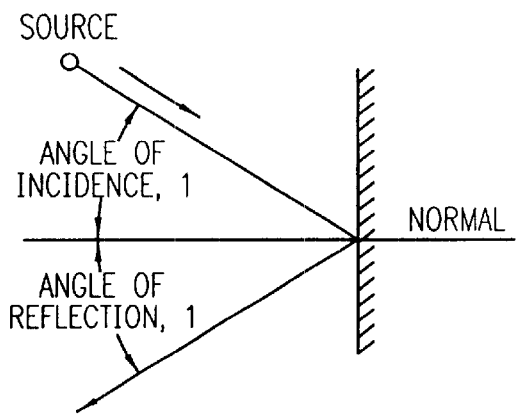
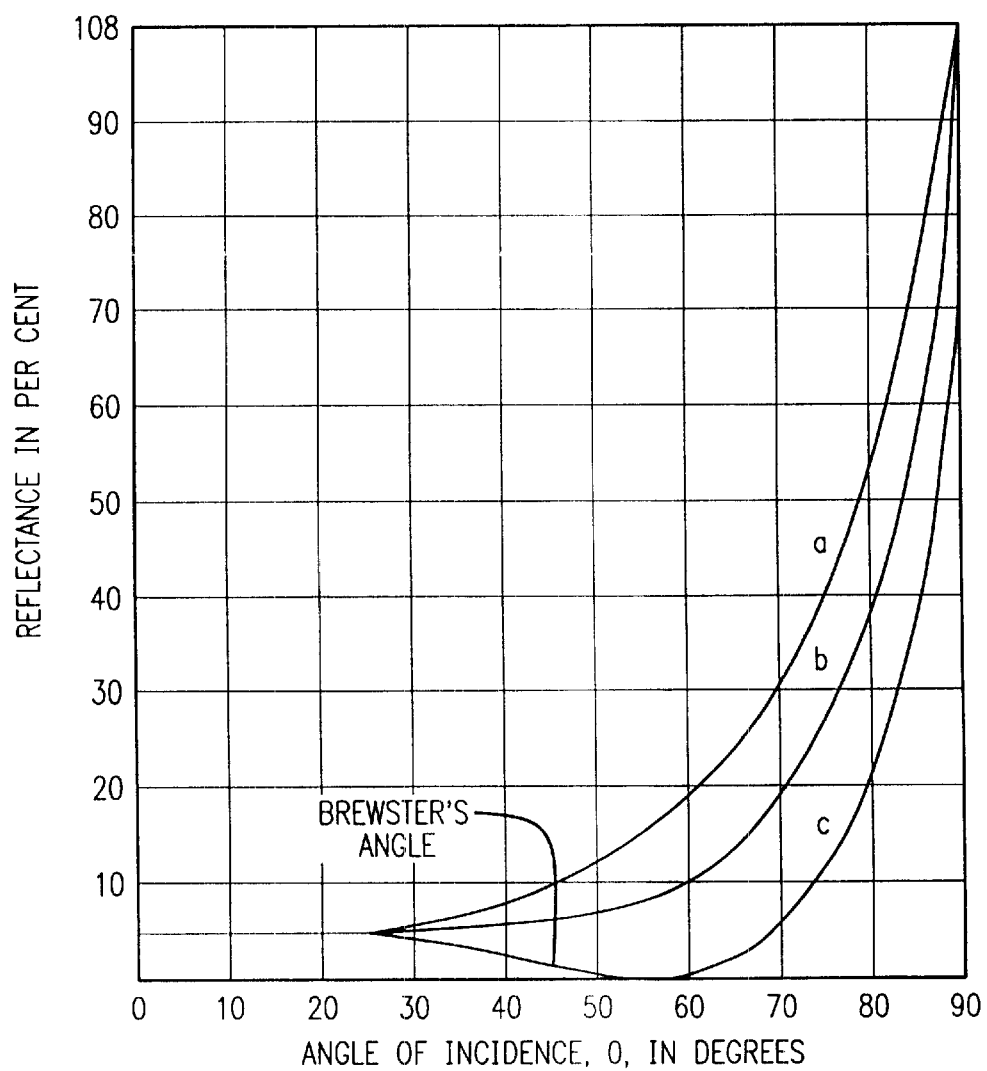
*FIG. 7*
*PRIOR ART*

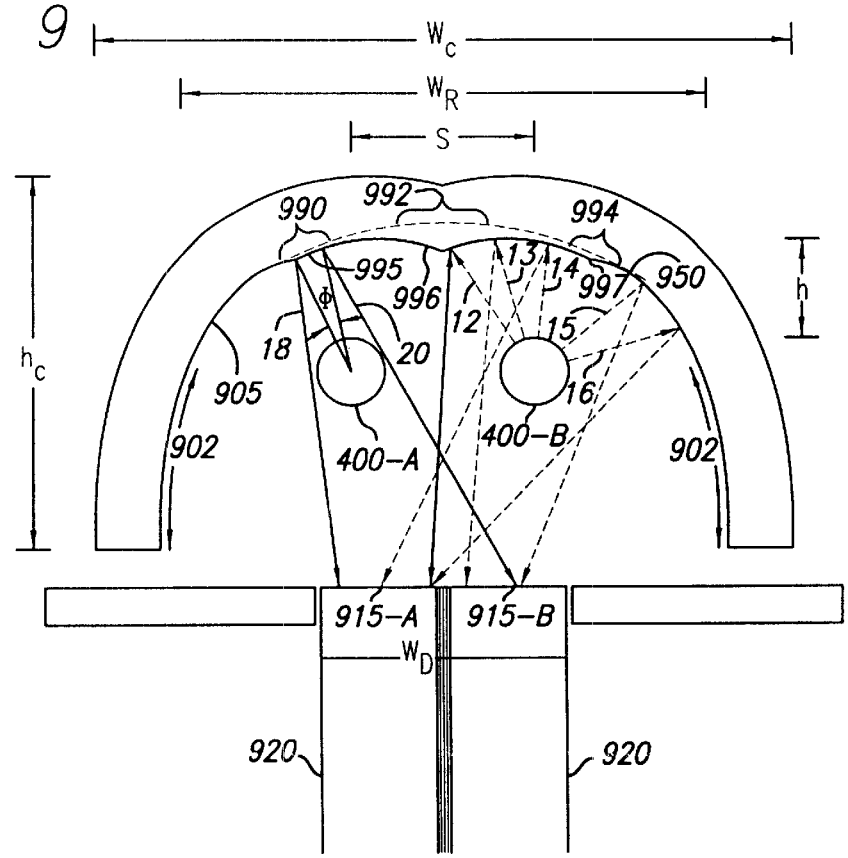
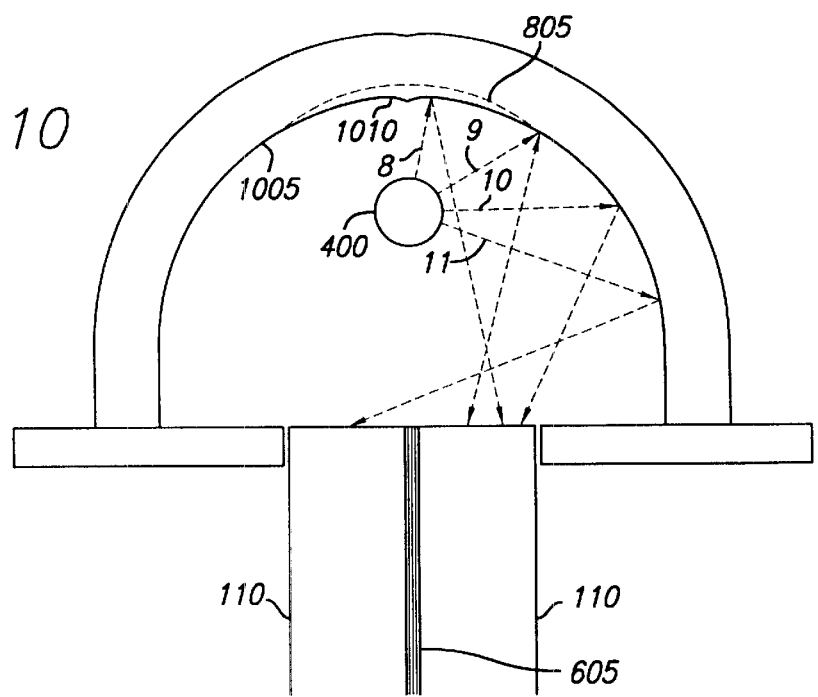

ILLUMINATION APPARATUS FOR EDGE LIT SIGNS AND DISPLAY

FIELD OF THE INVENTION

The present invention relates generally to an illumination source for signs utilizing miniature fluorescent lamps. More particularly, the present invention is directed towards an illumination source for edge lit display signs, such as edge-lit emergency exit signs.

BACKGROUND OF THE INVENTION

An illuminated display sign generally comprises a light source to illuminate a display surface upon which words, symbols, or other indicia are imprinted. Illuminated display signs include a variety of advertising signs, household number display signs, information bearing signs, and a variety of emergency information signs.

One common type of display sign in an emergency exit sign. Emergency exit signs include several different light source configurations. Exit signs are almost universally required in various types of commercial establishments under modern building codes, which specify the size, shape, and required luminance of the sign. FIG. 1 is a perspective view of an exit sign 100 in which the light source is configured to illuminate a display panel 130. The configuration shown in FIG. 1 is commonly known as an "edge lit" emergency exit sign 100 because light generated in a housing 120 is coupled to an "edge" (entrance surface) 112 of a transparent display panel 110. Display panel 110 is shaped to form a light guide which couples light to an outer display surface 130. Display panel 110 is typically made from a plastic material with colored indicia. The plastic display panel 110 acts as a light pipe or optical guide that transmits light to painted or printed opaque or translucent indicia within panel 110. Light passing through and around the indicia illuminates the indicia, thus creating a contrast between the clear plastic and the colored indicia.

FIG. 2 is an exploded side view of prior art edge lit emergency exit sign 100. As can be seen in FIG. 2, a lamp 150 occupies most of the volume of housing 120. Lamp 150 is commonly a T-5 fluorescent lamp, which is a tube-shaped lamp with a diameter of at least about 16 millimeters. As shown in FIG. 2, commonly the diameter, D, of lamp 150 is greater than the width 170 of the plastic or glass panel sections 160, 162 comprising light guide 110. Depending upon the specific design geometry, typically less than 20–30% of the light emitted from lamp 150 enters guide 110 in a conventional emergency exit sign 100.

While FIGS. 1 and 2 show an emergency exit sign with only one display surface 130, it will be understood that edge lit emergency exit signs commonly have two opposed display surfaces such that two T-5 lamps 150 are placed side-by-side to illuminate two opposed side-by-side optical guides 110. The shape of optical guide 110 also has several different common shapes. Optical guide 110 may comprise planar or wedge-shaped pieces of glass or plastic. Thus while FIGS. 1–2 illustrate one common style of edge-lit emergency exit sign 100, it will be understood that there are several different commonly used styles of edge-lit emergency exit sign in use today.

Conventional edge-lit emergency exit signs have several drawbacks. One drawback is that an edge-lit emergency exit sign 100 has a substantial operating cost, consisting of electricity charges, replacement parts and related labor. Two T-5 lamps consume about 24 watts of input power. For many situations the exit sign must be illuminated at all times. The energy costs will depend upon local utility rates but can be significant in applications, such as office complexes, which have a large number of emergency exit signs. There are also significant maintenance costs. The lamps have a limited lifetime and must be frequently replaced. An edge lit sign with T-5 lamps typically has a useful lamp lifetime of about 12,000 hours. Since emergency exit signs are typically operated 24 hours a day, seven days a week, this corresponds to a useful lifetime of about 1.4 years. Conventional T-5 lamps are also hot cathode lamps which require the use of standard fluorescent lamp sockets to hold the lamps in place. In the confined space of an emergency exit sign the heat of the T-5 lamps tends to make the sockets brittle. This can necessitate replacement of the sockets as often as every three years, further increasing the maintenance costs.

Another drawback with using T-5 lamps to illuminate an edge lit sign is that it is difficult, given space constraints, to include a large enough battery in housing 120 to illuminate exit sign 100 during extended power outages. In addition to lamp 150, the sign must include other equipment such as a step down transformer, ballast, lamp sockets and holder, and a mounting mechanism to permit the lamp and socket holders to be inserted and removed from housing 120. There is not much room left over for an economical large capacity battery. Conventional edge lit emergency exit signs typically have a battery with sufficient energy for about 90 minutes of power to illuminate one T-5 lamp 150. While this is sufficient to address present statutory regulations, there is a growing interest in emergency exit signs which have sufficient battery power to provide two-to-four hours or more of backup power when normal line power is unavailable.

Light emitting diode (LED) light sources are one alternative to the use of T-5 fluorescent lamps in edge lit emergency exit signs. LED illumination sources are energy efficient and have a longer operating lifetime compared to T-5 lamps. Additionally, LED illumination sources typically can be powered from AC line voltage using a comparatively compact AC-DC power converter. FIG. 3 is an exploded perspective view of a prior art emergency exit sign 300 using an LED light source 330 including a plurality of LEDs 368. Exit sign 300 is similar to one sold commercially by LITHONIA LIGHTING™ of Decatur, Ga. LED light source 330 is shaped to slide into a housing 352 and typically includes an electrical connector 362 to receive line power and an AC-DC voltage converter (not shown in FIG. 3) to convert AC line voltage into low-voltage DC suitable for driving the LEDs. Top and bottom surfaces 382, 384 of LED light source 330 are shaped to fit into slots 380 in housing 352. LED light source 330 typically includes about 60 LEDs for a dual faced sign in order to achieve a reasonable total light output. A diffuser panel 364 is disposed to diffuse the light from LEDs 368 prior to the light entering acrylic panels 354. Panels 354 are shaped to form two tapered optical guides with graphic symbols 356 spelling out the word "EXIT." One advantage of LED light source 330 is that LEDs have a long operating lifetime, resulting in a cost savings over T-5 fluorescent lamps. Additionally, an LED light source 330 typically uses two-to-three watts of power for an exit sign with two opposed display surfaces, resulting in about a factor of eight-to-twelve energy saving compared with two T-5 lamps 150.

However, LED light source 330 has several drawbacks. One drawback is that the brightness of an edge lit sign 300 using LED light source 330 is typically only about ⅓ that of an edge lit sign 100 using two T-5 lamps 150. The low brightness of an LED light source 330 is a significant disadvantage because it reduces the distance at which individuals can see edge lit sign 300, particularly in large, darkened, or smoke-filled rooms. Another drawback is that LED sources tend to have less contrast than conventional white light sources. In exit signs illuminated by a conventional T-5 lamp, the panels are illuminated by a white light. The indicia, which are colored, convert the white light into colored light (e.g., red). There is a large contrast between the brightly light colored indicia and neighboring portions of the display surface, which are faintly lit by white light. Commonly available, low cost LEDs, however, are typically monochromatic, i.e., they produce light of a single color, such as red or green. Although the price and availability of high-powered LEDs at a variety of wavelengths (colors) is improving, a low cost embodiment of LED light source 330 will typically be limited to red LEDs or green LEDs. One consequence of a monochromatic LED light source 330 of a single color (e.g., red light) is that the contrast in the sign is reduced because the plastic display panels 354, in the regions between indicia, tend to faintly emit the light of the same color as the indicia and the corresponding monochromatic LED color. For example, if only red LED's are used as a light source (with red colored indicia) the letters of the word "EXIT" appear as bright red but on a faintly red background. The contrast is thus reduced compared with T-5 lamps and other white light sources. Another problem with a monochromatic LED light source 330 is that it cannot be used to make a universal retrofit kit, i.e., a kit to replace a conventional T-5 lamp in a pre-existing sign. The colored indicia of the display panels of pre-existing emergency exit signs typically come in several different colors, with red and green being the most common display colors. An LED light source with red LED is unsuitable for illuminating green colored display surfaces whereas green LEDs are unsuitable for illuminating red colored display surfaces.

Although emergency exit signs 100, 300 are one of the most common forms of edge lit display signs, there are also a variety of other types of edge-lit signs or displays. These include a variety of advertising and display signs in which light from a fluorescent lamp is channeled along a light guide to one or more display surfaces. In these applications, the monochromatic (single color) output of LED light source 330 may be a severe limitation. For example, many edge-lit advertising displays utilize multicolor graphical display surfaces which are inconsistent with a monochromatic light source 330.

What is desired is a new illumination apparatus for illuminating edge lit signs and displays which has a white light with a brightness comparable to conventional fluorescent lamps but which has a significantly lower power consumption, and longer life.

SUMMARY OF THE INVENTION

The present invention comprises an optical module to facilitate the use of miniature fluorescent lamps in edge-lit display signs and other lighting applications. The present invention is generally directed towards the problems of improving the coupling of light from the lamps to the display surfaces and to protecting the miniature fluorescent lamps from deleterious mechanical stresses, all self-contained in one compact module.

Broadly speaking, the optical module of the present invention is intended for use with a miniature tube-shaped fluorescent lamp having first and second flexible electrical leads attached to first and second ends of the lamp and comprises: an optical chassis having a first support surface and a second support surface; a first resilient socket having a receptacle shaped to receive the first end of the lamp; a first clamp coupled to said optical chassis, the first clamp shaped to engage the outer surface of the first socket; a second resilient socket having a receptacle shaped to receive the second end of the lamp; a second clamp coupled to the optical chassis, the second clamp shaped to engage the outer surface of the second socket; an optical reflector disposed on the first surface of said optical chassis; wherein the sockets are configured to resiliently support the lamp above the surface of the optical reflector in the assembled optical module with the leads of the lamp extending through the sockets. A ballast is preferably included in the optical module. The ballast preferably includes a voltage converter, such as an AC-AC voltage converter to convert AC line voltage into a voltage suitable for the lamp and/or a DC-AC voltage converter to convert a low voltage DC source, such as a battery, into a voltage suitable for the lamp.

In a preferred embodiment, the reflector is shaped to increase the amount of light coupled to an edge lit display sign. The shape of the reflector determines the angle at which reflected light rays impinge upon the entrance surface of the optical guide of an edge lit display. The reflector is preferably shaped to adjust the angle at which reflected rays enter the optical guide to improve the coupling efficiency.

One object of the present invention is an optical module that is self-contained and compact enough to contain lamps and all related components into one package which fits into the same space as only the T-5 lamps fit into. In a preferred embodiment, the width of the optical module is less than or equal to two T-5 fluorescent lamps and its associated ballast, thereby permitting the optical module of the present invention to be substituted for a T-5 optical module in pre-existing lighting applications, such as edge-lit emergency exit signs.

Another object of the present invention is an optical module which reduces the deleterious affects of mechanical shock and vibration on miniature lamps. In a preferred embodiment, the lamps are supported by resilient sockets with the lamps raised above the surface of the reflector by a distance of several millimeters, which permits the lamps to flex without striking the surface of the reflector in response to a mechanical impulse to the optical module. Additionally, the optical module preferably has surfaces which form a guard to protect the lamps from being struck thereby facilitating the transportation, insertion, and removal of the assembled module.

Still yet another object of the present invention is an optical module which is inexpensive to manufacture. In a preferred embodiment, the framework and support elements of the optical module are injected molded plastic pieces which snap together using a minimum number of screws or other metallic connectors.

Yet still another object of the present invention is an optical module for use with an ultraviolet lamp for use with fluorescent pigment display indicia.

A further object of the present invention is a universal light source for all display sign colors.

Yet further an object of the present invention is an optical module with a long operating lifetime.

Still yet further an object of the present invention is an optical module with a high efficiency and corresponding reduction in operating costs.

BRIEF DESCRIPTION OF THE DRAWINGS

FIG. 5A is an exploded perspective view of a preferred embodiment of the optical module of the present invention.

FIG. 7 is a prior art figure of the optical reflectance of light as a function of the angle of incidence.

FIG. 9 is a side view of a preferred lamp and reflector configuration, showing the paths of illustrative light rays.

FIG. 10 is a side view of a second lamp and reflector configuration showing the paths of illustrative light rays.

DETAILED DESCRIPTION OF THE INVENTION

Figure 4A:
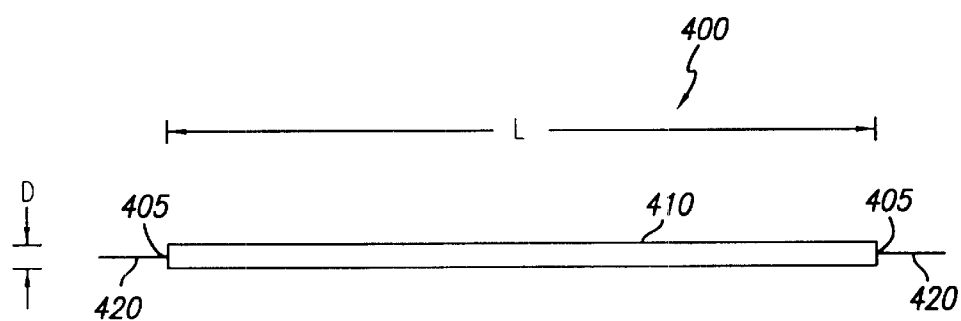
FIG. 4A is a top view of a prior art miniature cold cathode fluorescent lamp.

FIG. 4A is a top view of a prior art miniature cold cathode fluorescent lamp 400. Miniature cold-cathode fluorescent lamps are low power lamps sometimes used to provide background illumination in laptop computers. A variety of models of miniature cold-cathode fluorescent lamps can be obtained from Stanley Electric Co., Ltd. of Nakemeguro, Meguro-ku, Japan. Miniature cold cathode lamps require a substantial AC voltage, typically several hundred volts, in order to achieve optimal light output. Although the frequency at which a cold cathode lamp is driven varies, typically they are operated at a drive current frequency on the order of about 10–50 kHz, with 50 kHz being optimal for many lighting applications. Miniature cold cathode lamps typically have an optimum power output at an operating temperature between twenty-five to thirty degrees Celsius.

Miniature cold-cathode fluorescent lamps come in a range of lengths and diameters. The inventor describes miniature cold-cathode fluorescent lamps with a diameter no greater than about six millimeters as "sub-miniature" lamps, i.e., sub-miniature lamps are a subset of miniature lamps. Sub-miniature cold cathode fluorescent lamps are significantly smaller than conventional T-5 fluorescent lamps, which have a diameter of at least 16 mm. Although all miniature cold-cathode fluorescent lamps are fragile, sub-miniature cold-cathode fluorescent lamps are particularly fragile.

Figure 4B:
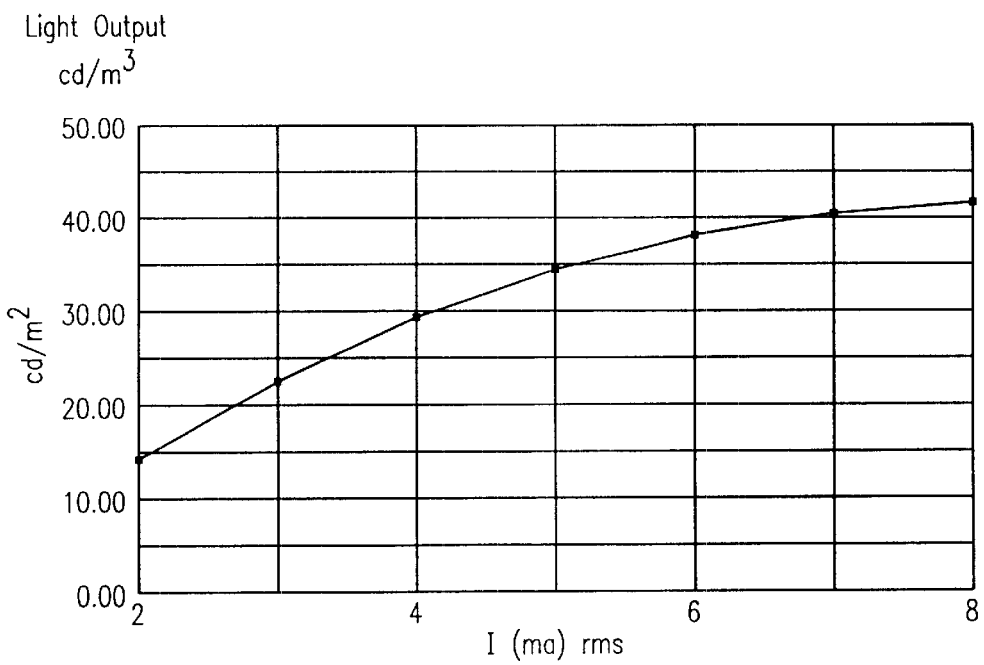
FIG. 4B is a plot of light output versus rf current for a cold cathode miniature lamp.
Figure 4C:
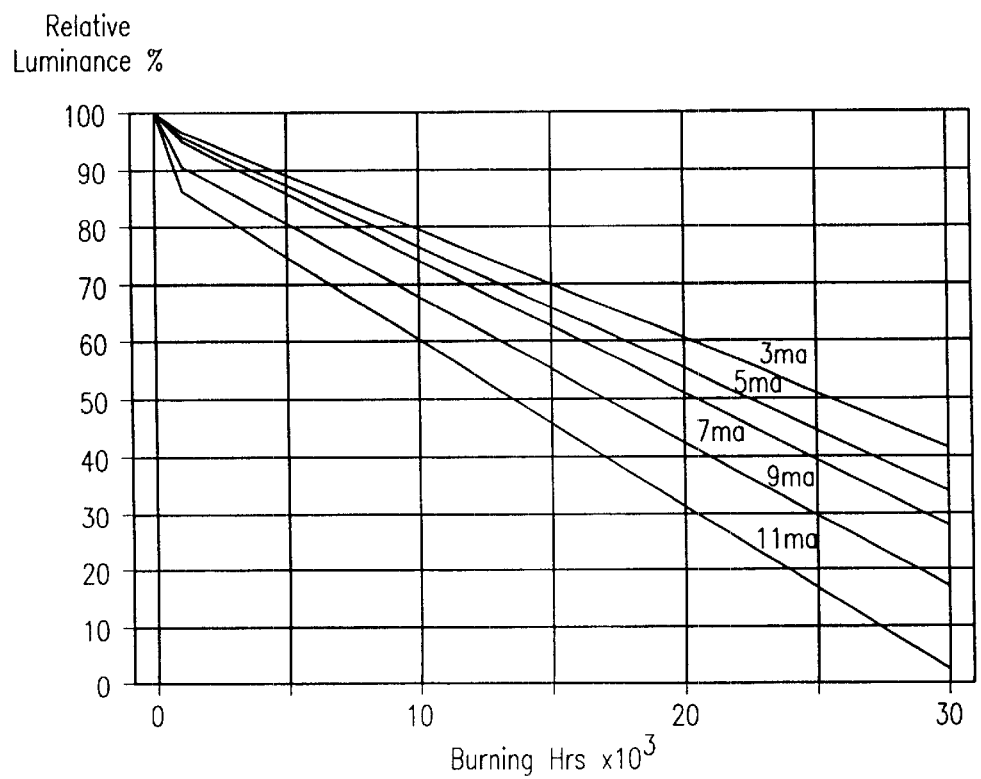
FIG. 4C is a plot of relative luminance versus time for the cold cathode miniature lamp of FIG. 4B at five different illustrative currents for a 20,000 hour lamp.

Although the power rating of miniature cold-cathode fluorescent lamps depends upon their length and diameter, a preferred size range of interest for emergency exit signs is a cold cathode lamp with a diameter, D, of between 2.5 and 3.0 millimeters and a length, L, of the body 410 of fluorescent lamp 400 of between 180 to 300 millimeters. Cold cathode fluorescent lamps in this size range draw several watts of power depending upon the operating current and operating voltage. As shown in FIG. 4A, miniature cold cathode lamps are typically sold with one flexible wire lead 420 soldered to each of the two ends 405 of lamp 400. This is unlike conventional T-5 lamps (not shown in FIG. 4A), which are typically sold with two rigid pin connectors attached to each end of the T-5 lamp and which are designed to mate with a conventional female fluorescent lamp socket. FIG. 4B shows the light vs current characteristic of a sub-miniature cold cathode fluorescent lamp 400 with a diameter of 2.6 millimeters. It can be seen that there is an operating regime from about 2 mA to 5 mA over which the light output increases almost linearly with drive current. However, the light output tends to increase at a slower rate at higher drive currents and tends to saturate at high drive currents. FIG. 4C shows a plot of relative luminance versus time for the lamp of FIG. 4A. A subminiature lamp 400 with characteristics similar to those of FIGS. 4B and 4C must typically be operated at a high frequency rms drive current of about 5 mA or less in order to have a reasonable lifetime.

Referring to FIGS. 4B–4C, the total light output, in lumens, of a sub-miniature lamp 400 operated at a drive current consistent with a long lifetime is approximately one-third that of a conventional T-5 lamp of similar length. This makes it difficult to use a small number of cold cathode fluorescent lamps to replace conventional T-5 lamps while achieving approximately the same light output as conventional T-5 lamps. Moreover, there are other factors which make it difficult to use miniature cold cathode fluorescent lamps to replace T-5 lamps in edge lit signs. These factors include: 1)miniature cold cathode fluorescent lamps 400 are much more fragile because of their small diameter; 2) miniature cold cathode fluorescent lamps 400 require non-standard electrical connections to flexible leads 420; 3) miniature cold cathode fluorescent lamps 400 have voltage (ballast) requirements which are different from conventional fluorescent lamps; 4) the small diameter of miniature cold cathode fluorescent lamps 400 results in poor optical coupling of light from the lamps in many lighting applications; and 5) the non-standard electrical connections of miniature cold cathode fluorescent lamps means that there is no commercially available mounting means available for the lamps.

The present invention generally comprises an optical module which facilitates using miniature cold cathode fluorescent lamps as an illumination source in edge lit emergency exit signs and which may conveniently be used to retrofit an existing sign. However, it will be recognized that the optical module of the present invention may be used for other applications as well. It will also be recognized that the optical module of the present invention may be used with other miniature lamps which have a tube shape body 410 and flexible leads 420 similar to that of a miniature cold cathode fluorescent lamp 400.

Figure 1:
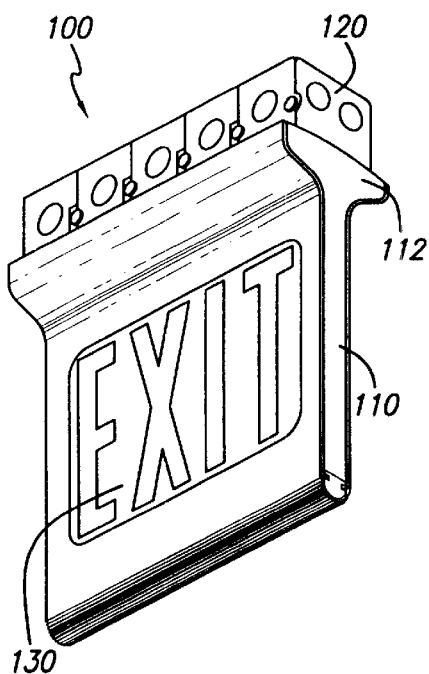
FIG. 1 is a perspective view of a prior art edge-lit emergency exit sign.
Figure 2:
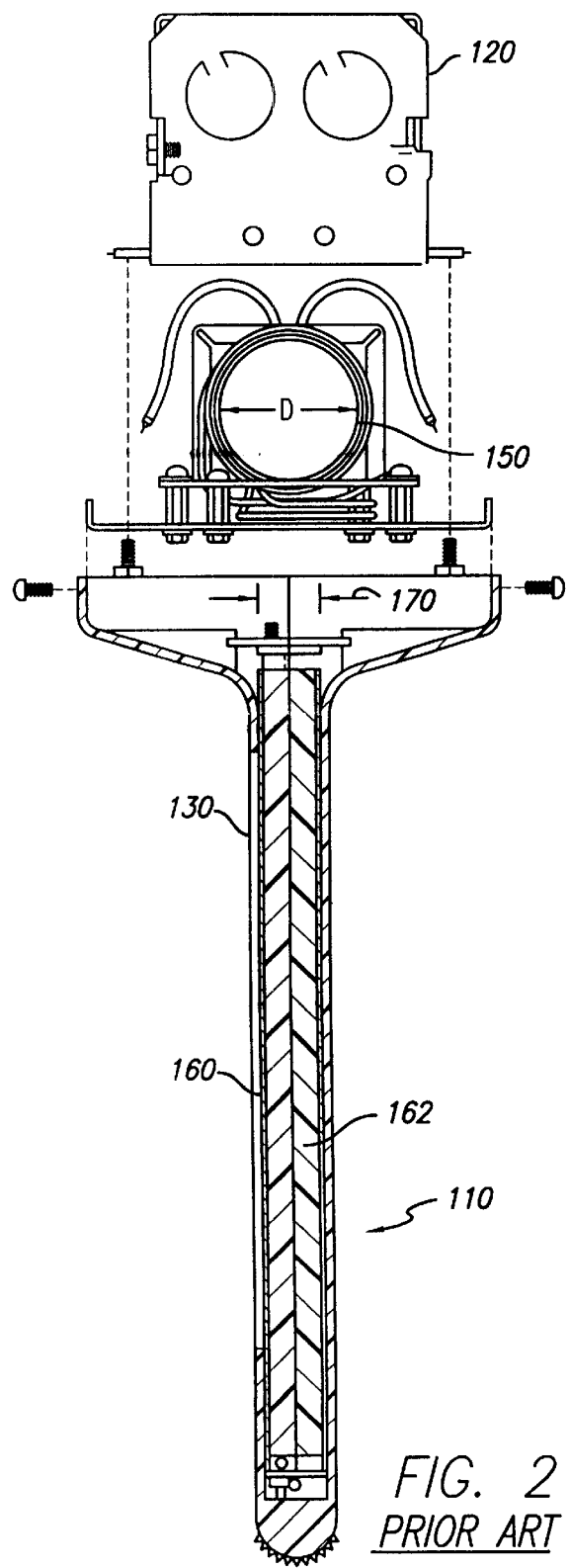
FIG. 2 is a partially exploded side view of the prior art emergency exit sign of FIG. 1.
Figure 3:
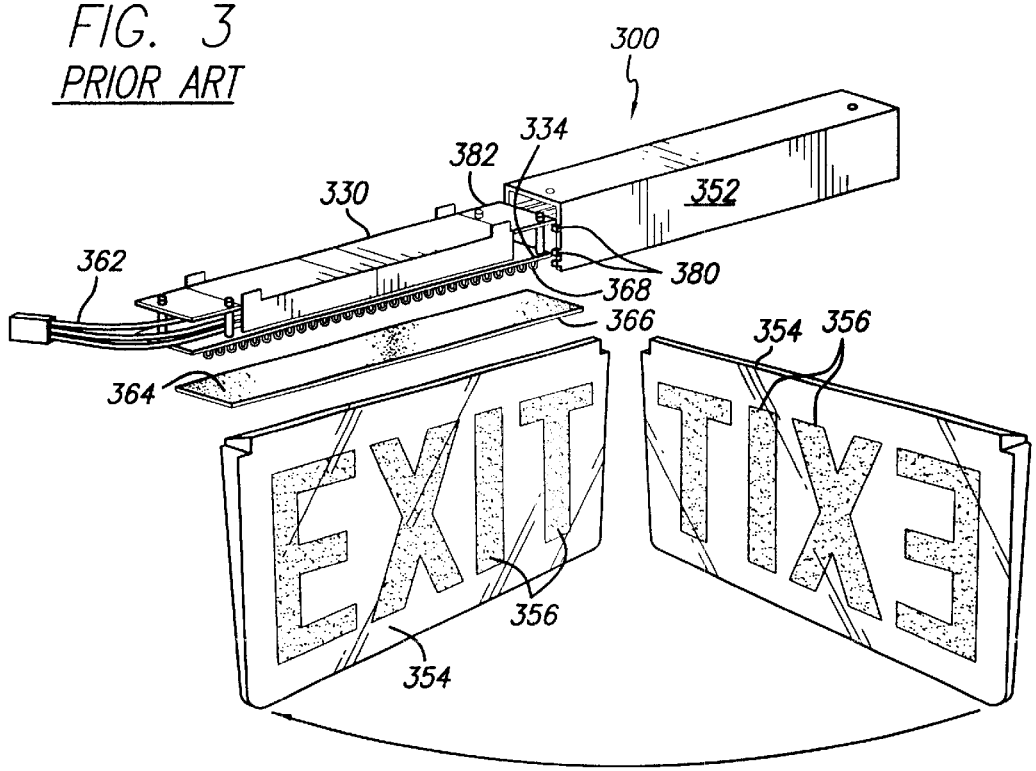
FIG. 3 is an exploded perspective view of a second prior art emergency exit sign.

FIG. 5A is an exploded perspective view of a preferred embodiment of an optical module 500 of the present invention. One intended use of optical module 500 is as a substitute for light source 330 in edge lit signs similar to that shown in FIG. 3. Consequently, it is shaped to be inserted into a specific housing 352 as a direct replacement, or retrofit kit, for one particular style of light source 330 in one style of housing 352. However, it will be understood that optical module 500 may be shaped to fit into different housing shapes and styles as part of a new emergency exit sign, as a replacement kit for other styles of edge-lit sign, or as alternate light source in original equipment manufacturer (OEM) applications. It will also be understood that while optical module 500 is shown having two lamps 400 it may have any number of lamps, such as one, two, three, or more lamps. Additionally, as discussed below in more detail, optical module 500 is believed to have other applications in addition to emergency exit signs, including a variety of edge-lit display sign applications.

In a preferred embodiment, optical module 500 includes an optical chassis 515 to which other components are attached, i.e., chassis 515 is the framework which supports components such as lamps 400 and power supplies which drive the lamps 400. The rear surface 516 of optical chassis 515 is preferably shaped as a compartment to hold a ballast compartment 510 containing voltage converters and/or a battery backup power supply configured to convert line voltage (or battery voltage) into a voltage appropriate to power lamps 400. A cover 505 is shaped to mate with optical chassis 515. Cover 505 has a lip 507 which forms a mechanical coupling surface shaped to engage a groove in a housing (not shown in FIG. 5A) to facilitate insertion and mounting of the optical module in addition to removal of the optical module from the exit sign. However, other conventional mechanical couplers could be used in place of lip 507. Sidewalls 503 of cover 505 are shaped to fit into slots 580 in optical chassis 515. Air ventilation to ballast compartment 510 is provided via air holes 501 disposed in a surface 502 of cover 505. Optical chassis 515 also preferably has spacers 517 arranged to form an air gap between the lip 507 of cover 505 and optical chassis 515 in the assembled module 500.

Figure 5B:
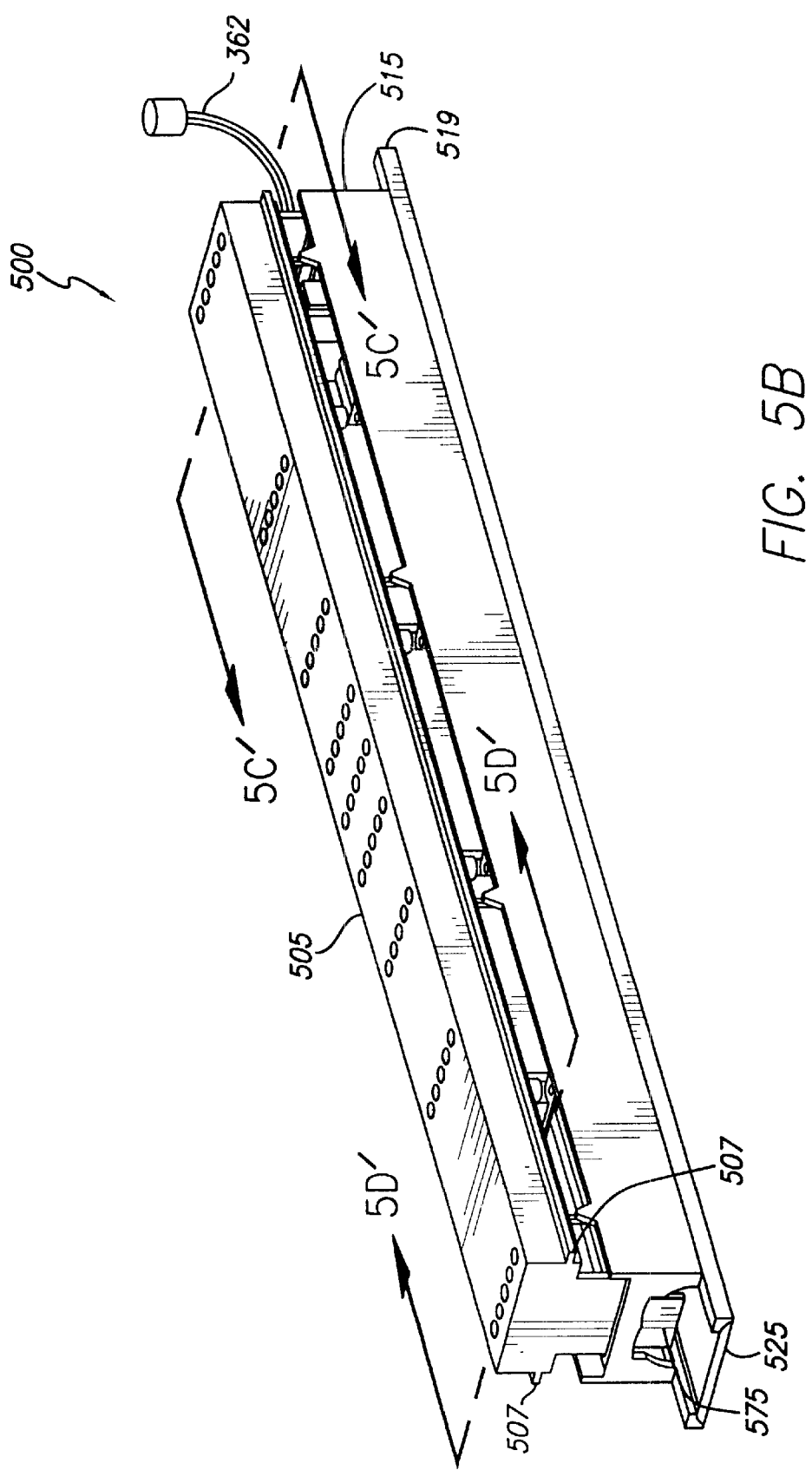
FIG. 5B is a perspective view of the assembled module of FIG. 5A.
Figure 5C:
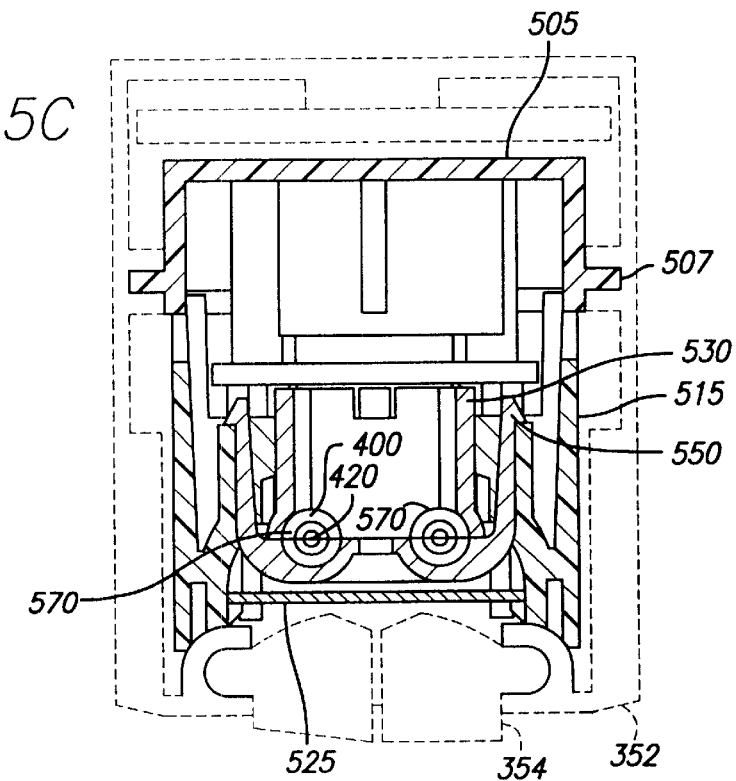
FIG. 5C is a cross-sectional view of the module of FIG. 5B along line 5C—5C.
Figure 5D:
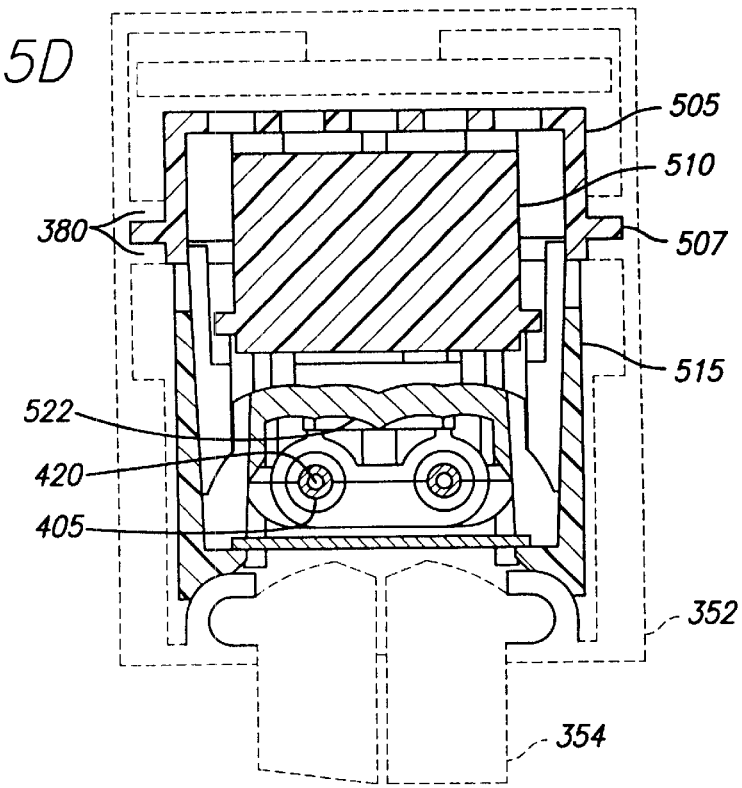
FIG. 5D is a cross-sectional view of the module of FIG. 5B along line 5D—5D.

FIG. 5B is a perspective view of the assembled module 500. A power connector 362 is preferably connected to provide AC line power to ballast 510. FIG. is a cross sectional view along line 5C'—5C' of FIG. 5B, with the housing and panels of an edge lit emergency exit sign shown in phantom. FIG. 5D is a cross-sectional view along line 5D'—5D' of FIG. 5B, also showing, in phantom, the housing and display panels of an edge lit emergency exit sign. As can be seen in FIGS. 5C, 5D, lip 507 is shaped to slide into a first slot 380 of a housing 352 of an emergency exit sign.

Figure 5E:
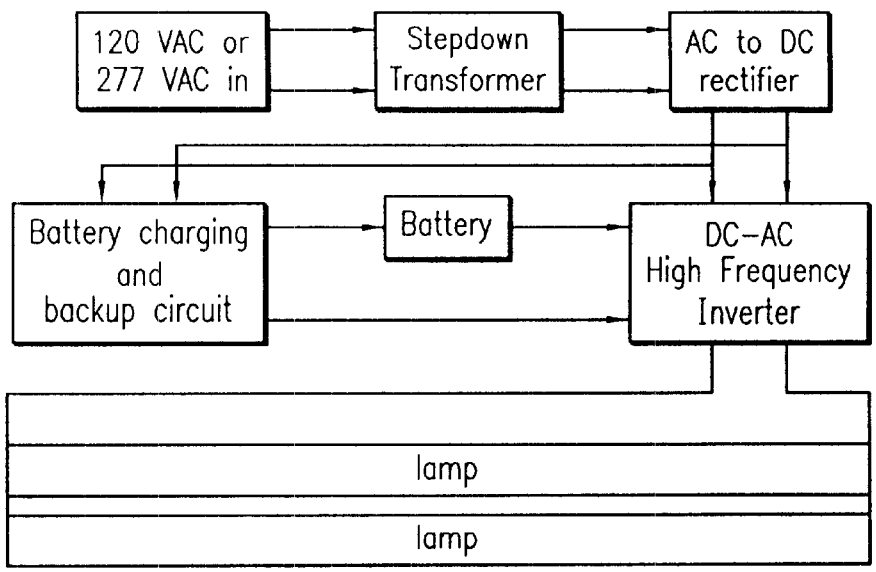
FIG. 5E is a schematic block diagram showing a first preferred electrical ballast configuration for the optical module of the present invention with battery backup operation.
Figure 5F:
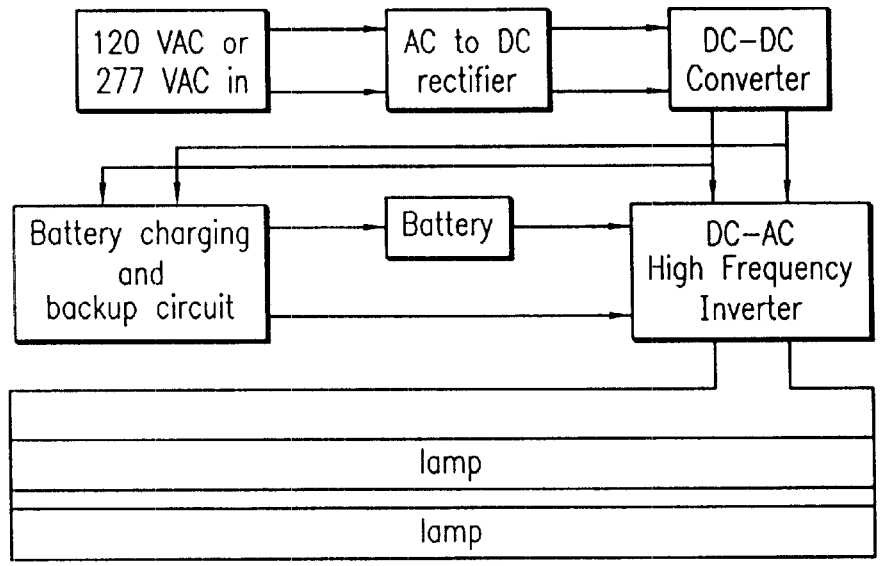
FIG. 5F is a schematic block diagram showing a second preferred electrical ballast configuration with battery backup operation.

The general principles of AC-DC and DC-DC voltage converters are well known and are not part of the present invention. However, ballast 510 preferably includes a high frequency switch mode power supply to convert AC line voltage into a voltage appropriate for lamp 400. It is known that switch mode power supplies can be made to be extremely compact and capable of operating at a variety of input voltages or line frequencies. Consequently ballast 510 can be made comparatively compact compared to the power supply, stepdown transformers, and ballast requirements of conventional T-5 lamps. Additionally, ballast 510 preferably is coupled to a battery charging and backup circuit. FIGS. 5E and 5F are electronic block diagrams showing two preferred ballast configurations which include battery charging and low voltage DC backup circuits.

Referring again to FIG. 5A, optical module 500 includes several features to support and cushion the fragile miniature cold cathode lamps 400. The ends 405 of each lamp 400 are cushioned by resilient sockets 570. Resilient sockets 570 are preferably composed of a silicone compound suitable for electrical applications. Each socket 570 has a receptacle 574 shaped to slide around portion of lamp 400 proximate an end 405. As shown in FIG. 5A, socket 570 has a passageway 572 shaped to communicate flexible lead 420 out of socket 570, i.e., passageway 572 is connected to receptacle 574 in the body of socket 570. While FIG. 5A shows an elbow-shaped socket with an L-shaped profile, more generally socket 570 may have any suitable shape as long as it has a receptacle 574 shaped to received the end of the lamp and a passageway 572 for communicating lead 420 out of the body of the socket 570.

Each resilient socket 570 is held in place by a clamp comprising clamp sections 530 and 550. First clamp section 530 and a second clamp section 550 are shaped to engage the outer surfaces of sockets 570 forming a lampholder 575 holding one end 405 of lamp 400. Leads 420 pass out of lampholder 575 and are coupled to ballast 510. First clamp section 530 is preferably shaped to be engagably received by a channel 590 in optical chassis 515. It can be seen in FIGS. 5A and 5C that second clamp section 550 has hooks shaped to lock with the first clamp section 530 and with the edges of channel 590. This allows the second clamp section 550 to be snapped into place, locking the clamp sections 530, 550 to each other and to optical chassis 515. However, other mechanical coupling methods, such as screws or bolts, could be used instead to couple clamp sections 530, 550 to each other and to the optical chassis 515.

Figure 19:
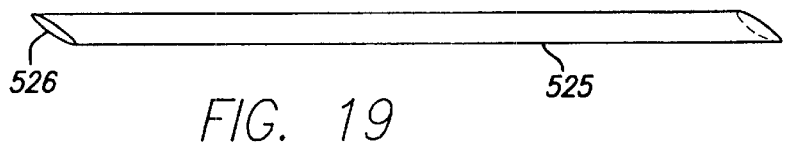
FIG. 19 is a perspective view of an alternate embodiment of an optical plate for use in the module of FIG. 5A.

The two lampholders 575 are dimensioned to support each lamp 410 above the surface of reflector 522 of optical chassis 515. Preferably, the body 410 of each lamp 400 is supported a significant distance above the surface of the reflector, i.e., a distance greater than the diameter of the lamp 400. In a preferred embodiment, lamp 400 is held 3.7 mm from the surface of the reflector. The resilient sockets 570 cushion the lamps 400 while the spacing of the lamps 400 from the reflector permits them to flex during transportation, installation, or in the event of mechanical shock and vibration to the assembled exit sign (e.g., during an earthquake). This further reduces the potential for breakage of lamps 400. In the assembled module 500, an optical plate 525, such as a transparent plate or a translucent plate, is disposed several millimeters below the lamps 410. In a preferred low cost embodiment optical plate 525 does not significantly alter the trajectory of light rays passing through optical plate 525. However more generally optical plate 525 may also comprise one or more optical elements, such as one or more lens elements, to focus light from module 500. For example, as indicated in FIG. 19, optical plate 525 may be curved or shaped to form a lens. In a preferred embodiment, lamps 400 are disposed several millimeters from plate 525 and several millimeters from reflector.

In the assembled module 500, lamps 400 are protected by plate 525, and surfaces 516, 519, 523 which form a guard protecting lamps 400 from being accidentally struck. Consequently, the assembled module 500 may be shipped as an assembled unit using ordinary packaging methods. This makes module 500 particularly useful as a retrofit kit, since it can be shipped and installed as an assembled unit.

Referring to FIGS. 5C and 5D, it can be seen that the assembled module is designed to slide into a housing 352. Consequently, optical module 500 may be used as a retrofit kit for emergency exit signs 300 similar to that shown in FIG. 3. However, it will be recognized that mechanical coupling surfaces 507 may be shaped in a variety of ways and module 500 may also include other types of mechanical couplers, such as bolts, screws, and locking pins. Consequently, the specific design of the optical module may be adapted for insertion in specific existing types of styles of display signs.

Experiments by the inventor indicate that the fraction of the total light output of module 500 which is coupled into the display panels 110 of an emergency exit sign is significantly greater than that of conventional T-5 lamps. The preferred reflector design shown in module 500 permits an emergency exit sign with two subminiature lamps 400 with a 6 watt input to produce a total light output at the display surface which is 50% greater than a conventional edge lit sign using two T-5 lamps with an input power of 32 watts for a 277 volt model.

As a basis of comparison, ray tracing calculations were performed for an emergency exit sign using two conventional T-5 lamps. Each T-5 lamp has an optical flux of 350 lumens. A total light flux of about 108 lumens is coupled from the two lamps into the top entrance surface of the display which corresponds to about 15.5% coupling of light emitted from the lamps into the display panels.

Similar ray tracing calculations were performed for the preferred embodiment of optical chassis 515. The lamps have a diameter of 2.6 millimeters, a length of 280 millimeters, and have a flux of 115 lumens each. The lamps are spaced apart by about 0.3 inches. A total of about 160.5 lumens of flux is coupled into the entrance of the guides for the preferred embodiment. This corresponds to 45.8% of the total light output of lamps 400 being coupled into the display panels.

FIGS. 6–14: Optimized Reflector Design For Improved Illumination And Lifetime

As previously discussed in regards to FIGS. 4B and 4C, a miniature or sub-miniature cold cathode fluorescent lamp 400 has a maximum light output which is typically much less than that of a T-5 lamp. Moreover, it is desirable to operate lamp 400 at the lowest practical rms current in order to improve the lifetime of lamp 400. However, a single miniature lamp operated at a current consistent with a long operating lifetime may only have one-half to one-third the total light output of a conventional T-5 lamp, depending upon the diameter of the miniature cold cathode lamp. In order to achieve the greatest energy savings, it is desirable that each T-5 lamp be replaced by one miniature cold cathode fluorescent lamp of about the same length. Consequently, the total optical coupling of each miniature lamp to the display panel should be about a factor of two-to-three higher than that of a conventional T-5 lamp arrangement in order to have a light output from the display panels comparable to a conventional T-5 lamp arrangement.

It is thus desirable to use a reflector which increases the fraction of light coupled to the display panels, particular if a small number of cold cathode fluorescent lamps 400 are used. However, a compact module 500 permits only limited room for a reflector. Additionally, the lamps 400 tend to block a significant fraction of reflected light.

The inventor has developed a low profile reflector design that is specifically designed to increase the coupling of light into the display panels for the unique geometry of edge-light displays, such as wedge-shaped displays. This permits a small number of lamps 400 to produce a light output comparable to conventional T-5 lamps.

Figure 6:
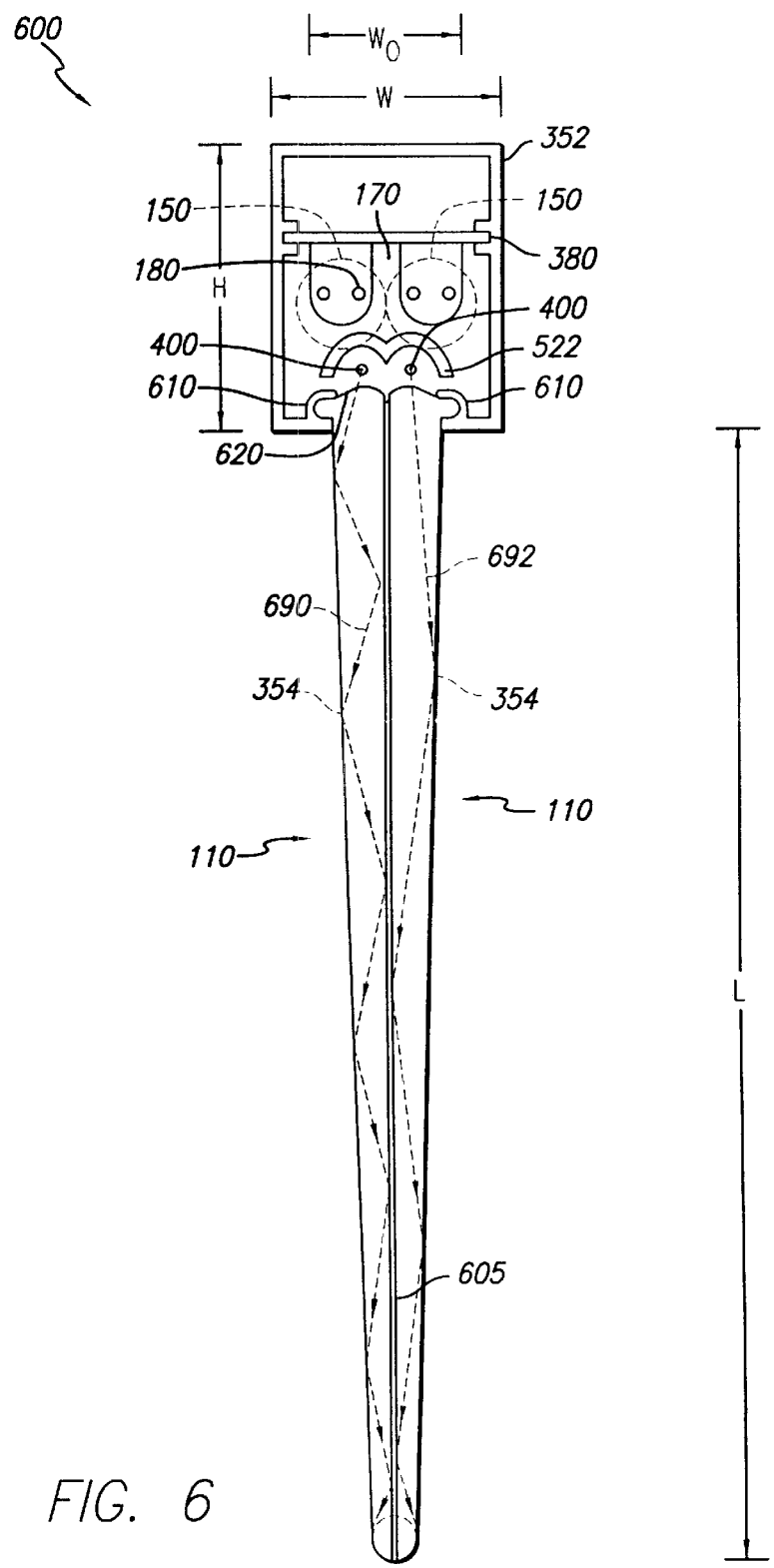
FIG. 6 is an illustrative partial side view of an installed optical module of the present invention showing the optical geometry of the installed module.

The problems solved by reflector 522 may be discussed in regards to FIG. 6. FIG. 6 is an illustrative side view of an assembled double-sided edge lit sign 600 with a side panel of the housing 352 removed. Some components of module 500 are omitted to illustrate the geometry of the lamps 400 of the present invention in an assembled emergency exit sign 600. Two conventional T-5 lamps 150 are shown in phantom to illustrate the optical geometry of the present invention compared with the prior art. As shown in FIG. 6, sign 600 has two tapered acrylic panels 354 held by slots 610 in housing 352. Each panel 354 has the words "EXIT" proximate the outer surface of each panel 354 in accord with conventional practice. A reflective layer 605, such as a layer of a reflective plastic or mylar, is disposed into a slot between panels 354 to form two tapered light guides 110 which transmit light along the length, L, of each panel. Reflective layer 605 also serves to block the view of the opposed EXIT sign indicia on the opposite side of the panels, thereby improving visibility. Commonly, panels 354 are attached together to form one integral unit. The paths of two illustrative light rays 690, 692 are shown, in phantom, traversing each light guide 110. The two light rays are shown entering each waveguide 110 at a different entrance angle such that the rays traverse different paths. Light rays which reflect off of the reflector surface 605 and the surface dielectric/air interface reflect at an angle equal to the angle of incidence. Generally, an optical ray that enters the waveguide at a shallow angle, such as ray 692, experiences fewer reflections than a ray, such as ray 690, which enters at a steeper angle.

As can be seen in FIG. 6, the housing 352 of pre-existing edge lit sign 600 has a width, W, and height, H. The width, W, varies with design style but is typically less than about four centimeters. The height, H, also varies with design style, but is typically less than about five centimeters. Two conventional T-5 fluorescent lamps 150 are shown in phantom inside housing 352 to illustrate the size constraints of a conventional housing 352. Lamp bi-pins 100 provides for mounting and electrical connection to a conventional T-5 socket 170. A conventional T-5 lamp 150 has a diameter of about 16 millimeters. Placed side-by-side, two T-5 lamps occupy most of the transverse inner width of housing 352. A PCB (printed circuit board) 160 connected to T-5 lamps bi-in sockets 170 is also inserted into groove 380. The T-5 lamps also occupy a substantial portion of the vertical height of housing 352 below groove 380. Moreover, the ballast required for two conventional T-5 lamps also requires a significant volume. A slide-in PCB module 160 dimensioned to slide into groove 380 of a standard housing 352 and containing two T-5 lamps will fill almost the entire volume of housing 352. Note that the limited space in housing 352 makes it impractical to include a reflector for conventional T-5 lamps. This also leaves relatively no space to incorporate other desirable features, such as a battery compartment to provide emergency power to lamps 150 during a power blackout, or related electrical components. Moreover, the current rough-in section 120 must be used to connect housing 352 to ceiling or walls and requires a substantial volume devoted to contain batteries, step down transformers, and ballast assemblies.

As shown in FIG. 6, miniature cold cathode lamps 400 have a small diameter compared to conventional T-5 lamps. The two miniature lamps 400 also have a diameter that is much less than the width, $W_O$ of entrance surfaces 620 of guides 110. For example, each lamp 400 may have a diameter of about 3 millimeters whereas the width $W_O$ of the entrance surfaces 620 of guides 110 may have a combined width of between ten to twenty-six millimeters. This is in contrast to conventional T-5 lamps 150 which have a combined width greater than 3.2 centimeters, which is greater than that of the two guides 110. Referring to FIG. 6, it can be seen that in conventional edge lit signs that lamps 150 are so closely spaced that it is impractical to add reflective elements into housing 352 to couple light into panels 354. Consequently, less than 20% of the light emitted from conventional T-5 lamps 150 is coupled into panels 354, with the coupling being largely determined by the width of the guides and other well-known geometrical considerations.

The small diameter of lamps 400 permits a reflector 522 to be included in a vertical height less than that of a standard T-5 lamp. As an illustrative example, consider a miniature lamp 400 with a diameter of three millimeters. If an annular space three millimeters in differential diameter around the length of lamp 400 is included, the effective diameter of the lamp, including the annular space, is still nine millimeters. A low profile reflector 522 with a vertical height of about three millimeters results in a module with a total vertical height of 12 millimeters, which is less than the diameter of a standard T-5 lamp, thereby facilitating the incorporation of a high voltage ballast and a battery back up circuitry in module 500. In the present invention, lamps 400 have a sufficiently small diameter such that a low-profile reflector 522 may be incorporated in module 500 to improve the coupling of light from lamps 400 to panels 110. Consequently, the optical module of the present invention may be designed to achieve up to about a three-fold improvement in the coupling of light from lamps 400 to panels 354 compared with conventional fluorescent lamps 150. This improved optical coupling of module 500, combined with the high light conversion efficiency of cold cathode lamps, results in a more than five-fold improvement in energy efficiency compared to conventional T-5 fluorescent lamps 150. In an optimized design, described below in more detail, optical module 500 consumes about 6 watts of power at a light output from display surfaces 130 that is comparable to a conventional fluorescent illumination source with two T-5 lamps 150 drawing 32 watts of electrical power for 277 volt circuits.

An optical chassis 515 with a reflector 522 to couple light into display panels in an edge lit emergency exit sign poses special optical reflector problems. One consideration for an optical chassis 515 is that the width of reflector 522 is limited by the width of the optical chassis 515. Consequently, the reflector will encompass a limited arc angle of the emitted light, i.e, the limited width of the reflector makes it difficult to design a reflector that encompasses more than about 40% of the light emitted from each lamp. An additional consideration is that an optical chassis 515 designed to replace an LED module or conventional T-5 lamps is limited to a maximum height governed by the design of the housing. This limits the maximum depth of reflector 522 and guard walls to a height less than or equal to a conventional T-5 lamp. Another consideration is related to the characteristics of low-cost optical reflector structures. Conventional metallized coating that can be deposited over plastics and polymers have a reflectivity of about 85%. This makes a single-pass reflector (i.e., one where reflected light rays reflect off of a single reflector surface) desirable.

Still yet another consideration for optical chassis 515 is that the light reflected from reflector 522 should efficiently couple into the display panels. FIG. 7 is a prior art curve showing the reflection coefficient of light at an air-glass interface as a function of incident angle. Curve (a) corresponds to light that is polarized in the plane of incidence. Curve (c) corresponds to light that is polarized in a plane perpendicular to the plane of incidence. Curve (b) corresponds to nonpolarized light. For an edge lit sign, the light emitted from lamps 400 can be modeled as nonpolarized, corresponding to curve (b). It can be seen that the reflection increases rapidly for an initial angle of incidence greater than about seventy degrees with respect to normal. Consequently, light rays that enter the entrance surface of the display panels at a glancing angle (i.e., an angle of incidence greater than about seventy degrees) will not efficiently couple into the display panels. Reflector 522 is thus preferably shaped to reflect a large fraction of light into the entrance of the display panel with an angle of incidence of about seventy degrees or less.

Figure 8A:
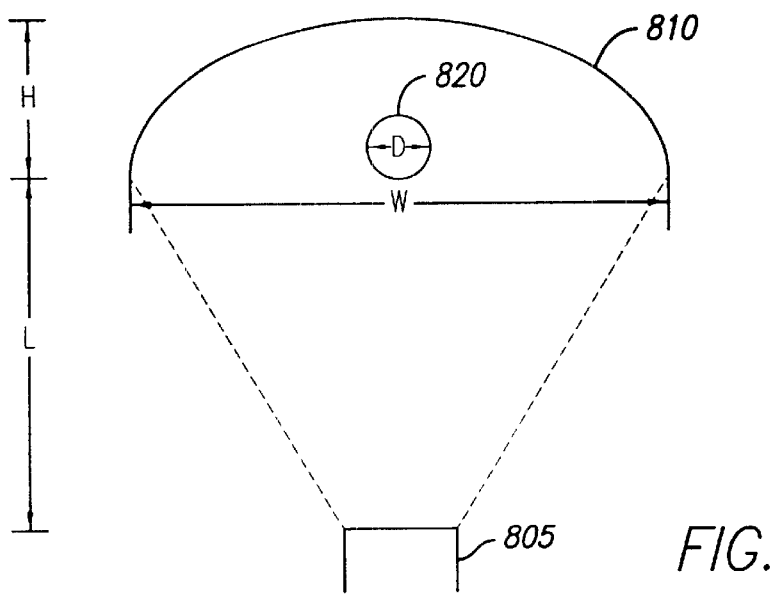
FIG. 8A is a side view showing an illustrative parabolic reflector configuration.
Figure 8B:
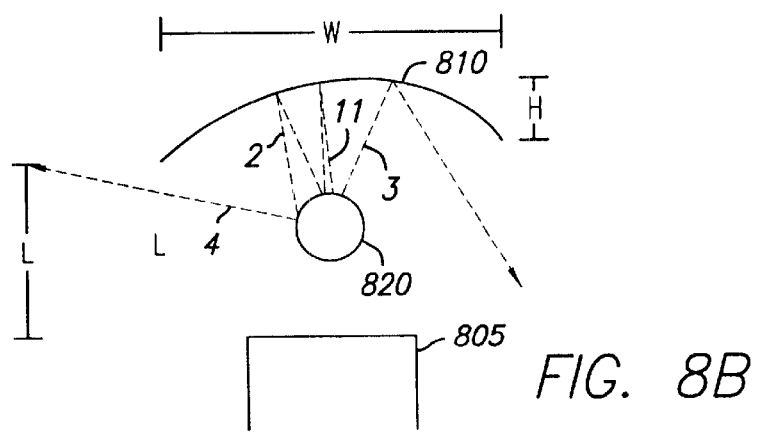
FIG. 8B is a side view of an illustrative low profile parabolic reflector with a single lamp.
Figure 8C:
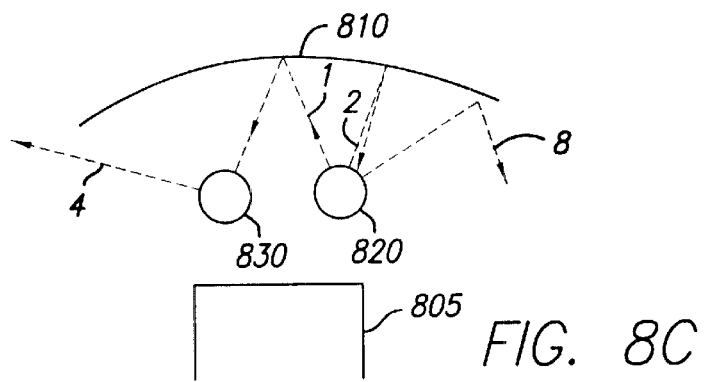
FIG. 8C is a side view of an illustrative low profile parabolic reflector with two lamps.

Conventional parabolic and quasi-parabolic reflectors are simple to manufacture. However, high efficiency parabolic reflectors do not work as well as desired given the space constraints in an edge lit emergency exit sign. Some of the drawbacks and limitations of conventional parabolic reflectors are illustrated with regards to FIGS. 8A, 8B, and 8C. FIG. 8A is an illustrative diagram of a reflector configuration which utilizes a conventional parabolic reflector 810 to maximize the fraction of light coupled into a guide 805. The parabolic reflector has a width, W, that is many times greater than the diameter, D, of the lamp. As an illustrative example, the width, W, of reflector 810 may be twenty times the diameter of lamp 820. Shadowing of lamp 800 can thus be ignored since only a small percentage of the reflected light impinges back onto lamp 820. The reflector placed a distance away, L, from guide 805 which is many times the diameter of lamp 820. Additionally, the height, H, of reflector 810 may be selected as required so that the curvature of reflector 810 focuses all of the reflected light back onto the entrance of guide 805. Note also that reflector 810 will receive 50 percent of the light emitted from lamp 820. In the parabolic reflector configuration of FIG. 8A, lamp 820 approximates a line source, which facilitates designing a parabolic reflector that couples a large fraction of the reflected light into the length of the guide 805. However, in an optical chassis 515 in which the width and height of the module is limited, an ideal parabolic reflector cannot be achieved. FIG. 8B illustrates the problems of conventional parabolic reflectors when there are space constraints. In FIG. 8B the width of the reflector is only several times the diameter of lamp 820. Additionally, the height, H, of the reflector is limited to be about the same as the diameter of the lamp and the total length, L, from reflector 810 to guide 805 is limited to several times the diameter of lamp 820. The limited width of reflector 810 coupled with a limited height reduces the design freedom. Consequently, some rays, such as ray 4, may not strike reflector 810 whereas other rays, such as ray 3, may be deflected at an inappropriate angle. Additionally, other rays, such as rays 2 and 1, strike lamp 820. Comparing FIG. 8A and FIG. 8B, it can be seen that in the geometry of FIG. 8B a greater fraction of reflected light is lost due to light reflecting back onto the lamp. FIG. 8C illustrates a parabolic reflector geometry similar to that of FIG. 8B but with two lamps 820, 830. Note that reflected light rays 1 and 2 may be reflected onto the lamp that emitted them or onto the other lamp.

FIG. 9 is an illustrative side view of a first preferred reflector 905 shape similar to what is shown in FIG. 5. Since reflector 905 is formed as part of an optical chassis, it will be noted that sidewalls 902 are connected to reflector 905. Sidewalls 902 do not couple reflected light to guide 110 but are part of the mechanical structure of optical chassis 515 and also serve to shield and protect lamps 400-A and 400-B. Sidewalls 902 are shown having a slight curvature where they connect with reflector 905 in accord with common plastic injection molding processes. There is a maximum reflector width, $W_R$, and reflector height, h. Note that $W_R$ is less than the maximum width of the optical chassis Wc and the height of the reflector, h, is less than the maximum height, hc, of the lamp and reflector portion of the optical chassis. A smoothly varying quasi-parabolic reflector surface 950 is shown in FIG. 9 in order to discuss several aspects of the shape of reflector 905 which permit it to achieve a higher efficiency than a conventional parabolic reflector with a comparable width and height. The width, $W_D$, of display panels 920 is shown in FIG. 9 as being less than the maximum reflector width, which is common in edge lit emergency exit display signs.

The two lamps 400-A and 400-B are spaced apart transversely by a distance S, as in the embodiment shown in FIG. 5. The paths of illustrative reflective light rays 12, 13, 14, 15, 16 are shown for one of the lamps 400A and 400B. As can be seen in FIG. 9, reflector 905 is shaped to improve the coupling of light to waveguides 110. The majority of the reflected rays enter the surface 915 of display panels 920 at a comparatively steep angle, i.e., less than or equal to about seventy degrees from normal. As can be seen by comparing reflector 905 to quasi-parabolic comparison line 950 (shown in phantom) the surface of reflector 905 preferably includes a plurality of segments 990, 992, 994, shaped to more effectively couple reflected light from lamps 400-A and 400-B to panel 920. It can be seen that segments 990, 992, and 994 have corresponding tips 995, 996, and 997. Segments 990, 992, 994 are localized regions which are a protuberance in which the curvature of the reflector can deviate substantially from a simple parabolic shape, thereby favorably redirecting light rays which would otherwise exit the reflector or be reflected back onto a lamp 400. As one example, it can be seen that a segment 992 of reflector 905 is shaped so that a ray 12 strikes segment 992 and enters surface 915-A of display panel 920. Referring to the leftmost lamp 400-A, it can be seen that reflector 905 is preferably shaped along segment 990 over solid angle Φ to reduce the shadowing of lamp 400. Referring to rays 18 and 20, the change in slope along segment 990 advantageously increases the angle of reflection compared to a smooth parabolic reflector 950, for which rays 18 and 20 would reflect back onto lamp 400-A. Consequently, reflector 905 is significantly more efficient at coupling reflected light from lamps 400-A and 400-B into guide 110 than is a quasi-parabolic reflector 950 of comparable size. Calculations indicate that segments 990, 992, and 994 increase the flux coupled into the guide by at least about 8% compared to a simple parabolic reflector for a lamp with a diameter of less than 3 millimeters.

FIG. 10 shows a single lamp embodiment in which the reflector is shaped to reduce the fraction of reflected light which reflects back onto the lamp and to increase the fraction of light that reflects into the display panel at a comparatively low angle of incidence. FIG. 10 is an illustrative side view showing a second preferred reflector shape for an embodiment with a single lamp 400 The paths of illustrative reflected rays 8, 9, 10, 11 are shown. Comparing quasi-parabolic comparison line 805, shown in phantom, it can be seen that the reflector 1005 includes region 1010 which is shaped to reduce deleterious reflections of light rays back onto the lamps that would otherwise occur with a quasi-parabolic reflecting surface 805 (shown in phantom).

While reflector 905 provides a benefit over a wide range of design parameters for optical chassis 515, the inventor believes that there are ranges of parameters over which the light coupling is optimal. Reducing the diameter of lamps 400-A and 400-B facilitates selecting a shape of reflector 905 which reduces shadowing by lamps 400-A and 400-B with reflected rays entering the entrance surfaces 915-A and 915-B at a low angle of incidence. Preferably, the diameter of each lamp 400 is less than or equal to about half the width of the entrance surface of a single light guide.

Figure 11:
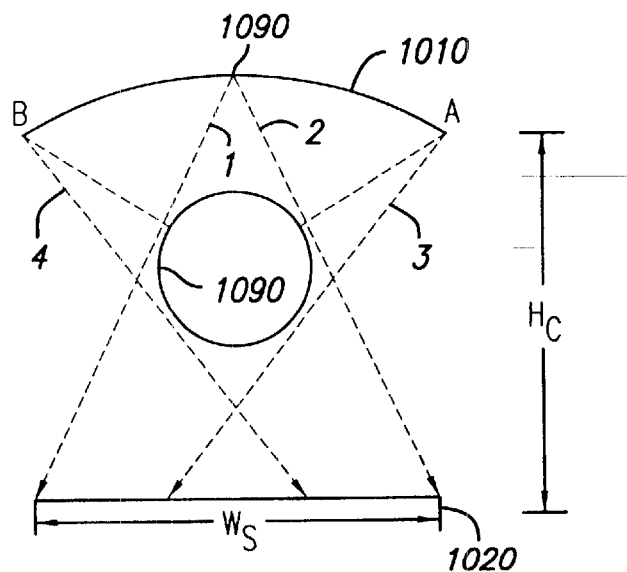
FIG. 11 is a side view of an illustrative lamp and reflector configuration illustrating the coupling geometry.
Figure 12:
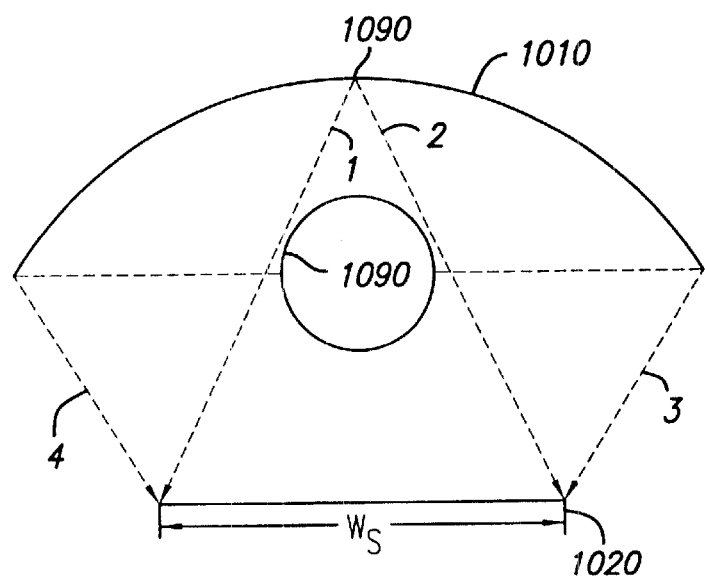
FIG. 12 is a side view of a second illustrative lamp and reflector configuration illustrating the coupling geometry.

FIG. 11 illustrates the shadowing geometry. A reflector 1010 is used to reflect light to guide 1020. Reflector 1010 is shown as having a generally parabolic shape for the purposes of illustration although in accord with FIG. 9 localized regions may have a non-parabolic shape. The height, hc, is held constant, as it would be in an optical chassis used as a replacement kit for standard sized T-5 lamps or LED sources. As can be seen in FIG. 11, appropriate selection of the diameter of lamp 1090 compared to the width of guide 1020 permits rays 1 and 2 to be deflected back into guide 1020 from a tip region 1090. However, a significantly larger diameter of lamp 1090 would result in the body of lamp 1090 blocking rays 1 and 2, which is undesirable. The edges of reflector 1010 at points A and B are preferably smoothly varying, i.e., quasi parabolic to facilitate a manufacturing process in which they are coupled to chassis walls or shields. Consequently, appropriate selection of the diameter of lamp 1090 permits rays 3 and 4 to be coupled to guide 1020 while relaxing the requirements on the shape of reflector 1010 at end points A and B. All of the reflected rays 1, 2, 3, and 4 preferably have an angle of incident that is fairly steep, i.e., less than or equal to about seventy degrees to achieve a high coupling efficiency of reflected light into guide 1020. Referring to FIG. 11, if lamp 1090 is placed approximately in the center between guide 1020 and reflector 1010, then a minimum diameter can be calculated for lamp 1090 so that rays 1, 2, 3, and 4 enter guide 1020 at some maximum entrance angle (e.g., seventy degrees) without striking lamp 1090. For a maximum entrance angle of about sixty to seventy degrees, the diameter of lamp 1090 is preferably about half the diameter of guide 1020 or less. While FIG. 11 shows a single lamp and a single guide 1020, a similar result can be obtained for two spaced apart lamps coupled into two guides as shown in FIG. 9. Additionally, as indicated in FIG. 12 a similar result is obtained even if reflector 1010 is slightly wider than the guide 1020. Again, assuming that there is a maximum acceptable entrance angle of reflected light rays, rays 1 and 2 reflected from a tip region 1090 of reflector 1010. Again, it is difficult to achieve efficient coupling unless the diameter of lamp 1090 is less than about half the width of guide 1020.

UV Lamp Embodiment

A conventional cold cathode fluorescent lamp 400 contains a gas within the lamp which produces ultraviolet radiation when the gas is excited by the electrical discharge. In conventional cold cathode fluorescent lamps the ultraviolet radiation excites a phosphor coating disposed on the inner wall of the lamp, with the chemical composition of the phosphor selected so that the phosphor radiates principally white light.

The inventor has recognized that cold cathode fluorescent lamp 400 may be an ultraviolet lamp. As is well known, light with a wavelength of 400 nanometers corresponds to violet, the shortest wavelength of visible light. Near ultraviolet light commonly refers to ultraviolet light with a wavelength between about 200 to 400 nanometers. Cold cathode fluorescent lamps which produce near ultra-violet light are commercially available, such as lamps with an emission wavelength of about 351 or 368 nanometers. The wavelength of a cold cathode fluorescent lamp may be tailored by a variety of methods, such as the use of black light filters or black light glass.

Figure 13:
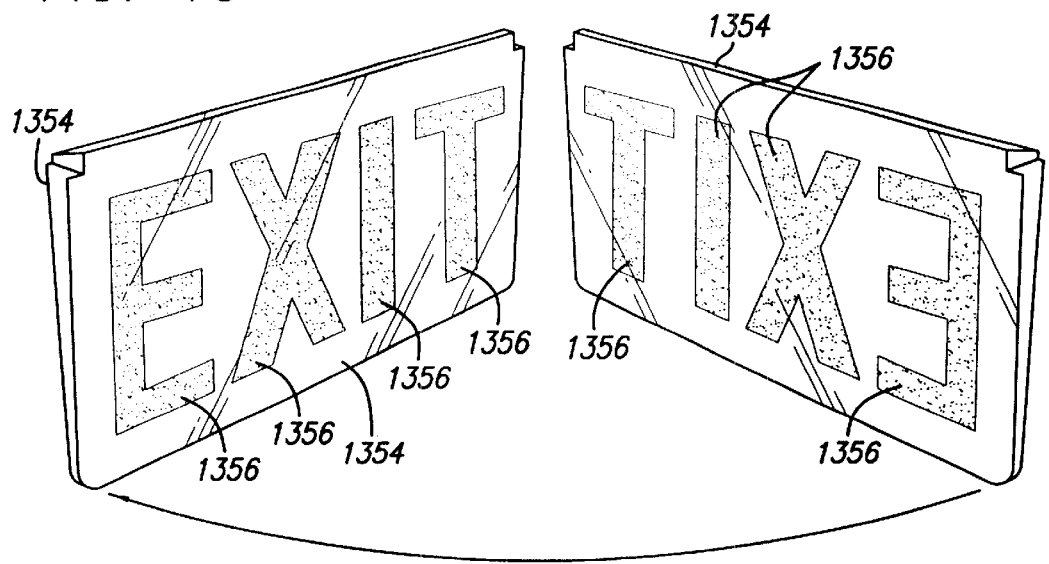
FIG. 13 is a perspective view showing a display panel in which the indicia include a fluorescent material responsive to near ultra-violet light.

FIG. 13 shows two display panels 1354 with indicia 1356 containing a fluorescent pigment material. The fluorescent material may be an ink or paint applied to a surface or it may be a material incorporated into a plastic or polymer material. A preferred class of fluorescent materials are fluorescent pigments. Fluorescent pigments are generally comprised of resinous solutions of dyes. There are commonly used in so-called "day glow" fluorescent plastics to make objects more visible under normal lighting conditions. Fluorescent pigments can be obtained from a variety of vendors, such as the RADIANT® K-600 colorants sold by Radiant Color of Richmond, Calif. Fluorescent pigments, such as those sold by Radiant Color, are commonly sold as pellets or powders that may be incorporated into a variety of colorants for different plastics. Alternately, fluorescent pigments may be incorporated into other materials, such as some types of inks and paints. Fluorescent pigments also have a "glowing" fluorescence color which depends upon their composition and the frequency of UV light they are exposed to. They are sold in a variety of fluorescent colors, such as chartreuse, green, orange-yellow, orange, red, cherise, pink, magenta, blue, and purple. Fluorescent pigments may be illuminated by a variety of different lamp wavelengths but a lamp wavelength range between about 365 to 380 nanometers is believed by the inventor to be optimal for many applications. However, the optimal ultraviolet lamp wavelength will depend on the optimum input wavelength of the fluorescent pigment for a particular desired color of emitted light.

Characters and indicia fabricated from a fluorescent material tend to visually stand out in normal lighting, but glow when exposed to ultraviolet light. The inventor has experimented with adding fluorescent pigments to plastics similar to those commonly used in the illuminated display art. Generally, conventional day glow plastics include a proportion of fluorescent pigment colorant selected so that plastic is opaque in normal illumination. However, the inventor believes that in the UV embodiments of the present invention it is preferable to use a significantly lower proportion of fluorescent pigment colorant so that the plastic is translucent in normal lighting but glows when exposed to ultraviolet light.

Conventional colored plastics illuminated by white light were compared with a plastic containing fluorescent pigments and illuminated by a near ultraviolet UV light source. The fluorescent pigment selected was a conventional pigment added in a proportion less than that used in day glow plastics, i.e., the plastic was not opaque. The wattage and light output of the white light and the near ultraviolet lamps were selected to be as similar as possible. The simulated plastic display surface containing fluorescent pigments was approximately 2.5 times brighter than a conventional colored plastic illuminated by a white light of about the same wattage. These results indicate that the use of a UV lamp 400 in module 500 with display panels 1354 containing fluorescent indicia 1356 may result in substantial improvements in the performance of an edge lit sign. It is believed that the use of a UV light lamp and fluorescent indicia permits significant improvement in efficiency compared to conventional lighting approaches. This is because conventional lighting systems must convert the ultraviolet light generated in lamp 400 to visible light via a phosphor coating in the lamp, with the resultant white light being filtered by conventional colored indicia. In conventional lighting systems a significant fraction of energy is lost in converting the ultraviolet light from the lamp to visible light and by the filtering process of converting the white light to colored light in conventional colored plastics. In contrast, in the UV embodiments of the present invention an ultraviolet lamp pumps the fluorescent indicia, which directly converts UV light into light of a desired color.

Figure 14A:
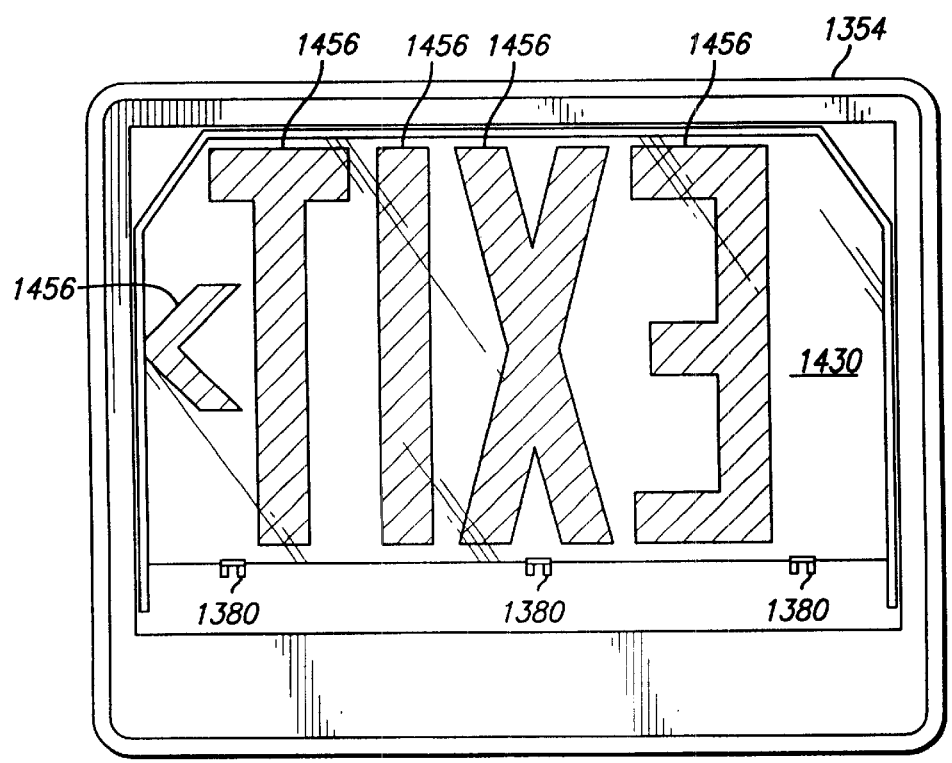
FIG. 14A is a front view showing an insertable element containing fluorescent indicia.

Some fluorescent materials degrade slowly over time with continued exposure to ultraviolet radiation. FIG. 14A shows an alternate embodiment in which an edgelit replaceable sheet 1430 contains fluorescent indicia 1456. Sheet 1430 is shown attached by clips 1380 to the interior of a display panel 1354. Note that sheet 1430 could also be implemented instead as an injection molded letter assembly, i.e., as only the letters or indicia instead of an entire planar sheet. Additionally, sheet 1430 could also be sandwiched between panels 1354. It also may be tapered in width to improve the uniformity of illumination of the letters or indicia.

While sheet 1430 and display panels 1354, 1356 are preferably used in an edge lit sign, the inventor has also recognize that they may be used in other ways as well. Near ultraviolet light, light close in wavelength to visible light, is comparatively safe to the human eye, particularly at low intensities and for a wavelength range close to the visible spectrum (e.g., 350 nanometers to 400 nanometers). Consequently, a sheet, such as sheet 1430, may also be indirectly illuminated by a source of near ultraviolet radiation. For example an external ultraviolet lamp and reflector may be used to illuminate a single sheet 1430.

Figure 14B:
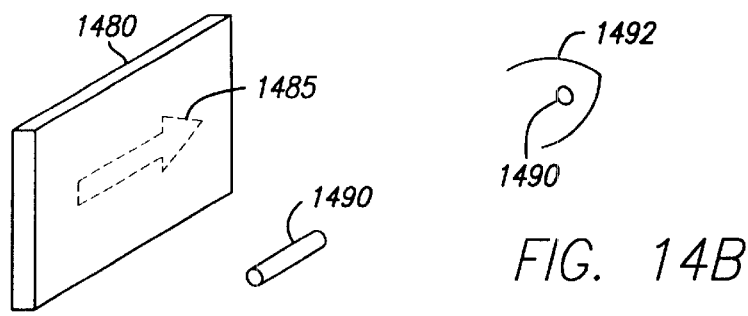
FIG. 14B shows an indirectly lit fluorescent display.

FIG. 14B shows an embodiment of a display sign 1480 in which the indicia 1485 comprise a plastic having fluorescent colorant. As indicated by the dashed lines in FIG. 14B, the concentration of fluorescent colorant is preferably selected so that the indicia are translucent (or transparent) in normal illumination but glow when exposed to ultraviolet light such as that from a UV light source 1490. Note that UV light source 1490 may be a localized indirect light source. As indicated in FIG. 14B, light source 1490 could be mounted, for example, spaced apart from display sign 1480. For this case, however, a reflector 1492 is desirable to focus and direct light from UV lamp 1490 onto display sign 1480.

FIGS. 15–18: Preferred Shock Resistant Socket Design

Miniature cold cathode fluorescent lamps are extremely fragile. During transportation or insertion of an assembled module 500 they may be subjected to substantial vibration or shock. As seen in FIG. 5A resilient sockets 570 and clamp sections, 530, 550 form lampholders 575. Resilient sockets 570 help to damp vibration upon lamps 400 and absorb shock. Clamp sections 530, 570 preferably support lamps 400 several millimeters above the surface of reflector 522, thereby permitting the body of each lamp to flex in response to mechanical vibration or shock. In a preferred embodiment, the lamps are separated greater than 3.7 millimeters from the reflector, which corresponds to a separation distance slightly greater than the diameter of lamp 400.

In a preferred low-cost embodiment of the present invention module 500, exclusive of lamps 400 and the electronic components of ballast 510, is preferably comprised primarily of plastic sections formed by an injection molding process. Preferably, optical chassis 515, the surface of ballast 510, cover 505, and clamp sections 530, 550 are all formed using an injection molding process. Reflector 522 is also preferably formed from injection molded plastic as one part, but with a reflective coating formed over the surface of reflector 522. A variety of suitable materials to create a reflective coating over a piece of injection molded plastic are well known in the plastic flashlight and sunglass arts. Any conventional reflective coating may be applied using conventional methods to form a reflective coating on the surface of reflector 522. It will be noted, referring to FIGS. 5 and 15, that reflector 522 is preferably shaped with a substantially uniform material thickness to facilitate an injection molding process.

While clamp sections 530, 550 could have a variety of shapes and mounting configurations, the inventor has developed a low-cost configuration which obviates the need for additional metal connectors or metal screws and which is detachable to facilitate the replacement of lamps 400. Preferably plastic engagement surfaces, such as plastic hooks and chamfers, are configured to permit the plastic components of module 500 to snap together without bolts or screws.

Figure 15:
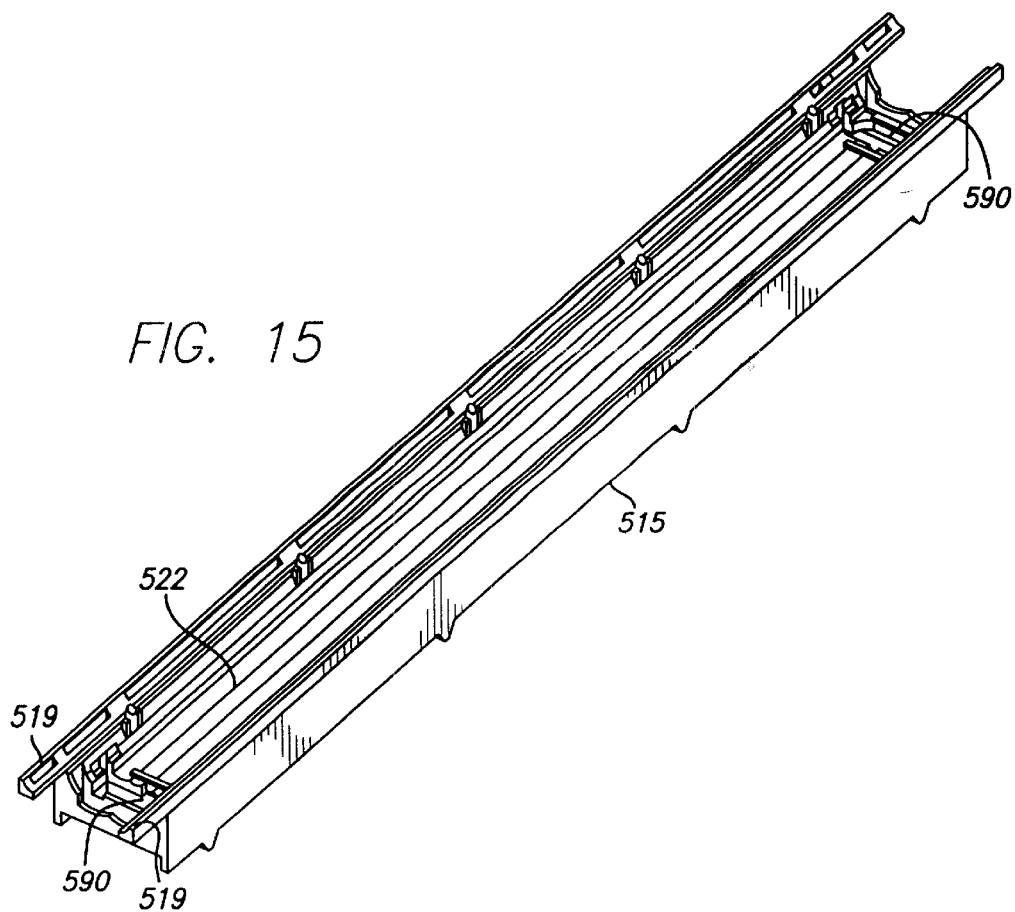
FIG. 15 is a perspective view of the optical chassis of the optical module shown in FIG.5.
Figure 16:
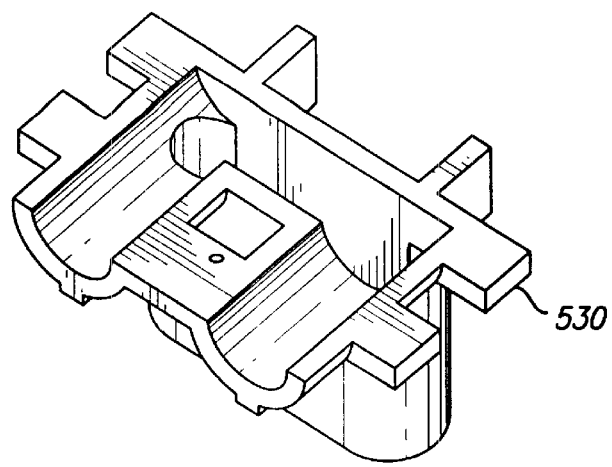
FIG. 16 an elevated perspective view of the bottom section of one of the clamps shown in FIG. 5.
Figure 17:
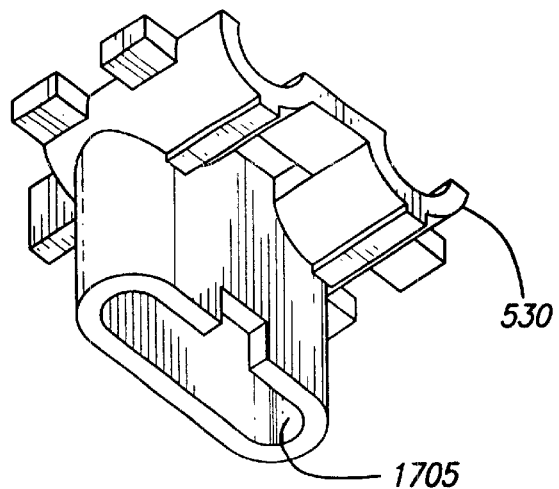
FIG. 17 is a rear perspective view of the clamp section of FIG. 16.
Figure 18:
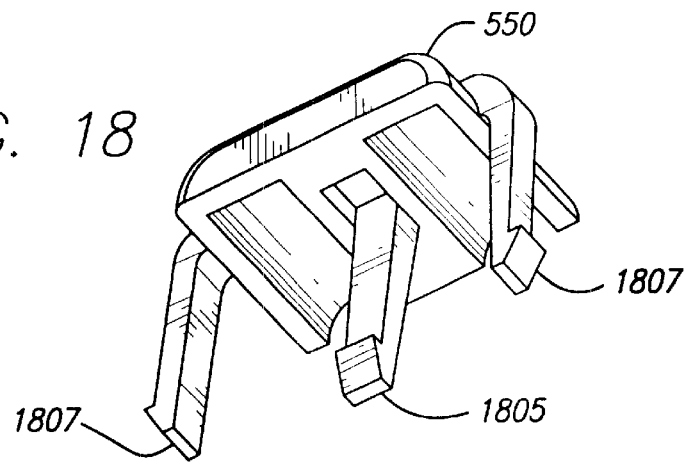
FIG. 18 is a perspective view of the top section of one of the clamps shown in FIG. 5.

Clamp sections 530, 550 are preferably shaped to distribute forces evenly over the surface of socket 570. They are also preferably shaped to permit the sections to be quickly decoupled from channel 590 of optical chassis 515 to facilitate insertion and removal of lamp 400. FIGS. 15–18 show detailed views of the inner surfaces of clamp sections 530, 550. FIG. 15 is a perspective view, from a different angle than that of FIG. 5, showing channels 590 in optical chassis 515. FIG. 16 shows an upper perspective view of first clamp section 530. FIG. 17 shows a rear perspective view of first clamp section 530 showing a detail of a channel 1705 for communicating lead wires 420. FIG. 18 is a perspective view, from a different angle than that of FIG. 5, showing the second clamp section 550 along with details of hooks 1805 which lock the clamp sections 530, 550 in place. The plastic comprising second clamp 550 is capable of sufficient flexure to permit hooks 1807 to be snapped into place to lock the socket assembly 575, 580 into place by insertion into channel 590 of chassis 515.

Design Of Optical Plate

FIG. 5A shows optical plate 525 as a planar sheet. However, as shown in FIG. 19, more generally, optical plate 525 could be shaped to have a non planar lens surface 526 or contain optical lens elements to improve the coupling of light to the display panels of an emergency exit sign. Additionally, an optical plate 525 performing a lens function may be desirable for use in other applications, such as path lighting, where it may be desirable to adjust the optical output of module 500, e.g., increase or decrease its divergence.

Thermal Characteristics of Optical Module 500

One of the benefits of optical module 500 is that the lamps 400 tend to operate at a nearly optimum temperature, which improves their efficiency. The lamps 400 of the present invention are supported below the surface of the reflector. Consequently, they will lose very little heat through direct thermal conduction at either end of the lamp held by the lampholder. They are partially isolated from the ambient atmosphere by a thin volume of air trapped by the optical plate such that convection losses will be moderated. Thermal equilibrium is achieved when the net power dissipation of the lamps equals thermal heat flow to the ambient environment. When lamp 400 is turned-on, it will initially increase in temperature, with its rate of temperature increase limited by its thermal mass (i.e., $\Delta T = \Delta Q R_T$, where $\Delta T$ is the temperature rise, $\Delta Q$ is the power dissipated over a short time interval, and $R_T$ is the thermal mass of the lamp). Since direct thermal conduction losses are low, when the lamp is turned on the temperature of lamp will quickly rise to a temperature at least several degrees Celsius higher than the ambient atmospheric temperature.

Cold cathode fluorescent lamps function most efficiently in a temperature range of about 25–30° C., which corresponds to a temperature range for which the operating voltage decreases and the light output increases. Since no heaters are required for the efficient operation of the cold cathode lamps of the present invention, it is believed by the inventor that the thermal properties of the preferred optical module 500 are such that the lamps operate at a temperature between about 25–30° C. (i.e., 5–10° C. higher than room temperature).

The thermal characteristics of the module may also be tailored to improve the light output of emergency signs which flash in an emergency notification mode. Although most emergency exit signs are operated in a continuous mode, signs which flash on and off in emergencies or during power failures are also used in some geographic areas. The thermal mass of a cold cathode fluorescent lamp with a diameter less than three millimeters is comparatively low. Consequently, the inventor believes that the thermal time constant required for lamp 400 to increase in temperature by five-to-ten degrees Celsius is a fraction of a second. This makes optical module 500 useful for the efficient illumination of flashed emergency exit signs and/or for flashed displays used in other applications (e.g., advertisement displays).

Other Applications Of Module 500

While the inventive optical module 500 is particularly adapted for use in emergency exit signs, the invention may have other uses as well. Optical module 500 is comparatively compact, energy efficient, and resistant to mechanical vibration and shock such that it may be used to replace conventional T-5 lamps in a variety of applications. As a first illustrative example, optical module 500 could be used to illuminate an advertising display. A variety of display signs, such as those used in food stores, have one or more conventional fluorescent lamps disposed inside a plastic housing. The reflector surfaces of optical module 500 may be shaped to illuminate a variety of display surfaces in addition to edge-lit displays. As a second illustrative example, module 500 may be used as a battery powered emergency illumination system. Optical module 500 could, for example, be used to provide emergency path lighting. However, for this case, reflector surfaces 521, 522 should be shaped to achieve the desired illumination of a path. For example, reflector 522 could be shaped to adjust the divergence of the emitted beam and directed to illuminate the ground. Optical module 500 may also be used with a mounting bracket as an undercounter task light. As a final illustrative example, optical module 500 could be used as a light source in campers, recreational vehicles, boats, or other applications where a compact, energy efficient light source replacing conventional T-5 lamps is desirable.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. An optical module for use with a miniature tube-shaped fluorescent lamp having first and second flexible electrical leads attached to first and second ends of the lamp, comprising:
   a) an optical chassis having a first support surface and a second support surface;
   b) a first resilient socket with a receptacle shaped to receive the first end of the lamp and having a passageway for threading the first lead through said first socket; and
   c) a first clamp coupled to said optical chassis, said first clamp shaped to engage the outer surface of said first socket;
   d) a second resilient socket with a receptacle shaped to receive the second end of the lamp and having a passageway for threading the second lead through said second socket;
   e) a second clamp coupled to said optical chassis, said second clamp shaped to engage the outer surface of said second socket; and
   f) an optical reflector disposed on the first surface of said optical chassis;
   wherein said sockets are configured to resiliently support the lamp above the surface of said optical reflector in the assembled optical module with the leads of the lamp extending through the passageways of said sockets, and wherein said sockets are configured to support the lamp above the surface of said reflector with a separation distance greater than the diameter of the lamp.

2. The optical module of claim 1, wherein said optical chassis is shaped to form guard surfaces to protect the lamp from breakage.

3. An optical module for illuminating an edge-lit display sign having a lamp housing and a display panel forming an optical guide with an optical entrance surface coupled to the housing and a display surface disposed proximate the outer surface of the panel, the optical module comprising:
   a) an optical chassis having a first support surface and a second support surface;
   b) a miniature tube-shaped fluorescent lamp having first and second flexible electrical leads attached to first and second ends of said lamp;
   c) a first resilient socket shaped to receive the first end of the lamp and having a passageway for threading the first lead through said first socket; and
   d) a first clamp coupled to said optical chassis, said first clamp shaped to engage the outer surface of said first socket;
   e) a second resilient socket shaped to receive the second end of the lamp and having a passageway for threading the second lead through said second socket; and
   f) a second clamp coupled to said optical chassis, said second clamp shaped to engage the outer surface of said second socket;
   g) an optical reflector disposed on the first surface of said optical chassis and oriented to reflect light into the optical entrance surface of the display panel;
   h) a ballast coupled to the second surface of said optical chassis, said ballast receiving an input voltage and producing a regulated AC voltage electrically coupled to the first and the second leads of the lamp; and
   i) a mechanical coupler connected to said optical chassis configured to support said module in the interior of the housing;
   wherein said sockets are configured to resiliently support said lamp above the surface of said optical reflector in the assembled optical module and wherein said optical reflector is shaped to increase the coupling of light into said entrance surface,
   wherein said socket is an elbow-shaped socket coupling said leads from said first to said second surface of said optical chassis.

4. The optical module of claim 2, further comprising a ballast connected to the module, said ballast electrically coupled to said first and said second leads of the lamp.

5. The optical module of claim 2, wherein each said resilient socket has a lead passageway extending at a ninety degree angle from the main body of the socket and each said clamp is shaped to form an elbow-shaped clamp mating around the surface of said socket.

6. The optical module of claim 5, wherein said socket and said clamps are configured to direct the lead wires of the lamp through the body of the optical chassis from said first support surface to said second support surface.

7. The optical module of claim 6, further comprising a ballast coupled to the second surface of said optical chassis, said ballast receiving an input voltage and producing a regulated AC voltage electrically coupled to the first and the second leads of the lamp.

8. The optical module of claim 7, wherein said optical module is configured to fit into a housing of an edge-lit emergency exit sign having a display panel with an optical entrance surface for receiving light from said optical module.

9. The module of claim 8, wherein said reflector is shaped to improve the coupling of light into said optical entrance surface.

10. The module of claim 8, wherein said reflector has at least one non-parabolic region shaped to reduce the fraction of light reflected back onto the lamp from said reflector.

11. The module of claim 8, wherein said optical module has a plurality of miniature tube-shaped fluorescent lamps, and wherein the total number of lamps has a combined diameter less than half that of said optical entrance surface.

12. The optical module of claim 9, further comprising:
   a battery backup power source coupled to said ballast.

13. An optical module for illuminating an edge-lit display sign having a lamp housing and a display panel forming an optical guide with an optical entrance surface coupled to the housing and a display surface disposed proximate the outer surface of the panel, the optical module comprising:
   a) an optical chassis having a first support surface and a second support surface;
   b) a miniature tube-shaped fluorescent lamp having first and second flexible electrical leads attached to first and second ends of said lamp;
   c) a first resilient socket shaped to receive the first end of the lamp and having a passageway for threading the first lead through said first socket; and
   d) a first clamp coupled to said optical chassis, said first clamp shaped to engage the outer surface of said first socket;
   e) a second resilient socket shaped to receive the second end of the lamp and having a passageway for threading the second lead through said second socket; and
   f) a second clamp coupled to said optical chassis, said second clamp shaped to engage the outer surface of said second socket;

g) an optical reflector disposed on the first surface of said optical chassis and oriented to reflect light into the optical entrance surface of the display panel;

h) a ballast coupled to the second surface of said optical chassis, said ballast receiving an input voltage and producing a regulated AC voltage electrically coupled to the first and the second leads of the lamp; and i) a mechanical coupler connected to said optical chassis configured to support said module in the interior of the housing;

wherein said sockets are configured to resiliently support said lamp above the surface of said optical reflector in the assembled optical module and wherein said optical reflector is shaped to increase the coupling of light into said entrance surface, and wherein said lamp is spaced apart from the surface of the reflector by a distance greater than the diameter of said lamp.

14. The module of claim 13, wherein each said clamp comprises a first clamp section and a second clamp section having hooks.

15. The module of claim 14, wherein said socket is disposed in a channel in said optical chassis and coupled to said optical chassis by said hooks.

16. The module of claim 13, further comprising:

a second miniature tube-shaped fluorescent lamp having first and second flexible electrical leads attached to first and second ends of said second lamp;

a third resilient socket with a receptacle shaped to receive the first end of the second lamp and having a passageway for threading the first lead of said second lamp through said third socket;

a third clamp coupled to said optical chassis, said first clamp shaped to engage the outer surface of said third socket;

a fourth resilient socket with a receptacle shaped to receive the second end of the lamp and having a passageway for threading the second lead of said second lamp through said fourth socket; and a fourth clamp coupled to said optical chassis, said second clamp shaped to engage the outer surface of said fourth socket;

wherein said third and fourth sockets are configured to resiliently support said second lamp above the surface of said optical reflector in the assembled optical module and wherein said second lamp is driven by said ballast, and wherein said second lamp is spaced apart from the surface of the reflector by a distance greater than the diameter of said second lamp.

17. The module of claim 16, wherein said first and second lamp are spaced apart from each other.

18. The module of claim 13, wherein said reflector is shaped to improve the coupling of light into said optical entrance surface.

19. The module of claim 13, wherein said reflector has at least one non-parabolic region shaped to reduce the fraction of light reflected back onto the lamp from said reflector.

20. The module of claim 13, wherein the total number of lamps has a combined diameter less than half that of said optical entrance surface.

21. A compact optical module for replacing T-5 fluorescent lamps in edge-lit display signs having a lamp housing and a display panel forming an optical guide with an optical entrance surface coupled to the housing and a display surface disposed proximate the outer surface of the panel, the compact optical module comprising:

a) an optical chassis having a first support surface and a second support surface, said optical chassis shaped to fit within the T-5 lamp housing;

b) a miniature tube-shaped fluorescent lamp having first and second flexible electrical leads attached to first and second ends of the lamp;

c) a first resilient socket shaped to receive the first end of said lamp; and d) a first clamp coupled to said optical chassis, said first clamp shaped to engage the outer surface of said first socket;

e) a second resilient socket having a receptacle shaped to receive the second end of said lamp; and f) a second clamp coupled to said optical chassis, said second clamp shaped to engage the outer surface of said second socket;

g) an optical reflector disposed on the first surface of said optical chassis and oriented to reflect light into the optical entrance surface of the display panel, said optical reflector shaped to improve the brightness and uniformity of illumination of the display surface;

h) a ballast coupled to the second surface of said optical chassis, said ballast receiving an input AC voltage and producing a regulated AC voltage electrically coupled to the first and the second leads of the lamp; and i) a mechanical coupler connected to said optical chassis configured to support said module in the interior of the T-5 lamp housing;

wherein said sockets are configured to resiliently support said lamp above the surface of said optical reflector in the assembled optical module and wherein said optical chassis and said supported lamps have a combined height less than the diameter of a single T-5 lamp.

22. The module of claim 21, further comprising:

a second miniature tube-shaped fluorescent lamp having first and second flexible electrical leads attached to first and second ends of said second lamp;

a third resilient socket with a receptacle shaped to receive the first end of the second lamp and having a passageway for threading the first lead of said second lamp through said third socket;

a third clamp coupled to said optical chassis, said first clamp shaped to engage the outer surface of said third socket;

a fourth resilient socket with a receptacle shaped to receive the second end of the lamp and having a passageway for threading the second lead of said second lamp through said fourth socket; and a fourth clamp coupled to said optical chassis, said second clamp shaped to engage the outer surface of said fourth socket;

wherein said third and fourth sockets are configured to resiliently support said second lamp above the surface of said optical reflector in the assembled optical module spaced apart from said first lamp and wherein said second lamp is driven by said ballast.

23. The module of claim 22, wherein the combined diameter of said lamps is less than half that of said entrance surface of said display panel.

24. The module of claim 22, wherein said reflector is shaped to improve the coupling of light into said optical entrance surface.

25. The module of claim 22, wherein said reflector has at least one non-parabolic region shaped to reduce the fraction of light reflected back onto the lamps from said reflector.

26. The module of claim 22, wherein said lamps each have a total light output less than half that of a single T-5 lamp and said reflector is shaped to more than double the fraction of light coupled to said display.

27. The module of claim 26, wherein said lamps have a diameter of three millimeters or less.

* * * * *